(12) United States Patent
Liu et al.

(10) Patent No.: US 12,362,978 B2
(45) Date of Patent: Jul. 15, 2025

(54) DATA SENDING AND RECEIVING METHOD AND APPARATUS

(71) Applicant: HUAWEI TECHNOLOGIES CO., LTD., Guangdong (CN)

(72) Inventors: Chenchen Liu, Shenzhen (CN); Genadiy Tsodik, Hod Hasharon (IL); Dandan Liang, Shenzhen (CN); Yan Xin, Ottawa (CA); Ming Gan, Shenzhen (CN); Shimon Shilo, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 18/166,965

(22) Filed: Feb. 9, 2023

(65) Prior Publication Data

US 2023/0198822 A1 Jun. 22, 2023

Related U.S. Application Data

(63) Continuation of application No. PCT/CN2021/111623, filed on Aug. 9, 2021.

(30) Foreign Application Priority Data

Aug. 10, 2020 (CN) .......................... 202010798092.8

(51) Int. Cl.
*H04L 27/26* (2006.01)
(52) U.S. Cl.
CPC .............................. *H04L 27/2615* (2013.01)

(58) Field of Classification Search
CPC ............. H04L 27/2621; H04L 27/2602; H04L 27/2614; H04L 27/2615; H04L 1/0009;
(Continued)

(56) References Cited

U.S. PATENT DOCUMENTS

2014/0153507 A1* 6/2014 Yang .................... H04L 27/2602
370/329
2018/0205587 A1* 7/2018 Xiang ................. H04L 27/2603
(Continued)

FOREIGN PATENT DOCUMENTS

CN 105052102 A 11/2015

OTHER PUBLICATIONS

Park et al., "PAPR issues for EHT ER SU PPDU," IEEE 802.11-20/1135r3, Jul. 27, 2020, 12 pages.
(Continued)

*Primary Examiner* — Sophia Vlahos
(74) *Attorney, Agent, or Firm* — Fish & Richardson P.C.

(57) ABSTRACT

This disclosure provides data sending and receiving methods and apparatuses. In an implementation, a device performs a non-replication operation on a frequency domain sequence on subcarriers of a first bandwidth, to obtain a frequency domain sequence on subcarriers of a second bandwidth in a transmission bandwidth, transforms the frequency domain sequence on the subcarriers of the first bandwidth and the frequency domain sequence on the subcarriers of the second bandwidth into a time domain, and performs radio frequency processing on time domain data and then sends the processed time domain data.

20 Claims, 11 Drawing Sheets

(58) Field of Classification Search
CPC . H04L 27/04; H04L 27/2626; H04L 27/2647; H04L 1/0041; H04L 1/0045
See application file for complete search history.

(56) References Cited

U.S. PATENT DOCUMENTS

| | | | |
|---|---|---|---|
| 2021/0391961 A1* | 12/2021 | Cao | H04L 1/08 |
| 2022/0029772 A1* | 1/2022 | Wu | H04L 5/0044 |
| 2023/0283421 A1* | 9/2023 | Lim | H04L 1/0003 370/338 |

OTHER PUBLICATIONS

IEEE P802.11be™/D0.01, "Draft Standard for Information technology—Telecommunications and information exchange between systems Local and metropolitan area networks—Specific requirements; Part 11: Wireless LAN Medium Access Control (MAC) and Physical Layer (PHY) Specifications, Amendment 7: Enhancements for extremely high throughput (EHT)," Jul. 2020, 33 pages.

IEEE P802.11ax™/D6.0, "PDraft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN," Nov. 2019, 780 pages.

IEEE Std 802.11-2016, "IEEE Standard for Information technology—Telecommunications and information exchange between systems; Local and metropolitan area networks—Specific requirements; Part 11: Wireless LAN Medium Access Control (MAC) and Physical Layer (PHY) Specifications," Dec. 7, 2016, 3534 pages.

International Search Report and Written Opinion in International Appln. No. PCT/CN2021/111623, mailed on Nov. 15, 2021, 15 pages (with English translation).

* cited by examiner

DATA SENDING AND RECEIVING METHOD AND APPARATUS

CROSS-REFERENCE TO RELATED APPLICATIONS

This application is a continuation of International Application No. PCT/CN2021/111623, filed on Aug. 9, 2021, which claims priority to Chinese Patent Application No. 202010798092.8, filed on Aug. 10, 2020. The disclosures of the afore-mentioned applications are hereby incorporated by reference in their entireties.

TECHNICAL FIELD

This application relates to the field of communication technologies, and in particular, to data sending and receiving methods and apparatuses.

BACKGROUND

An orthogonal frequency division multiplexing (orthogonal frequency division multiplexing, OFDM) technology is a multi-carrier modulation technology. The OFDM technology has advantages of high spectral efficiency and anti-multipath fading, but has a disadvantage of a high peak-to-average power ratio (peak to average power ratio, PAPR). Superposition of a plurality of subcarriers in OFDM generates a large peak signal. Therefore, a high power amplifier needs to have a large linear dynamic range. This increases costs of the high power amplifier and also reduces efficiency of the high power amplifier. If a peak value exceeds the linear dynamic range of the high power amplifier, in-band distortion and out-of-band dispersion are caused. Therefore, reducing the PAPR is a key technology to an OFDM system and has great significance. With rapid development of wireless communication technologies, features such as 320 MHz, 240 MHz, and preamble puncturing that are newly introduced in the wireless communication protocol 802.11be have a severer PAPR problem, and a PAPR on a larger bandwidth needs to be reduced.

Currently, a 6 GHz spectrum may be opened for use, and a low power indoor (low power indoor, LPI) communication mode is defined. This communication mode imposes a strict power density limit on an indoor device operating on the 6 GHz band. Such a strict power limitation greatly limits a transmission distance of an indoor Wi-Fi device operating on the 6 GHz band. To increase an indoor transmission distance, a duplicate mode (duplicate mode, DUP mode) is used to send a signal in the 802.11be standard. However, in the DUP mode of the 802.11be, same data is generated on a lower half bandwidth and an upper half bandwidth. This results in a high PAPR of the sent signal, and greatly affects system performance and transmitter efficiency.

SUMMARY

Embodiments of this application provide data sending and receiving methods and apparatuses, to reduce a PAPR of a transmit device, improve system performance, and improve communication reliability.

To achieve the foregoing objectives, embodiments of this application use the following technical solutions:

According to a first aspect, a data sending method is provided. The method includes: performing a non-replication operation on a frequency domain sequence on subcarriers of a first bandwidth in a transmission bandwidth, to obtain a frequency domain sequence on subcarriers of a second bandwidth in the transmission bandwidth, where the subcarrier includes a data subcarrier and a pilot subcarrier; and transforming the frequency domain sequences on the subcarriers of the first bandwidth and the second bandwidth into a time domain, and performing radio frequency processing on time domain data and then sending the data.

In a possible implementation, the performing a non-replication operation on a frequency domain sequence on subcarriers of a first bandwidth in a transmission bandwidth, to obtain a frequency domain sequence on subcarriers of a second bandwidth in the transmission bandwidth includes at least one of the following operations: reversely arranging, based on an arrangement of the frequency domain sequence on the subcarriers of the first bandwidth, the frequency domain sequence on the subcarriers of the first bandwidth after conjugation; performing phase rotation on a part or all of elements in the frequency domain sequence on the subcarriers of the first bandwidth; or multiplying an element in the frequency domain sequence on the subcarriers of the first bandwidth by an element in a first Gray sequence in a pairwise manner, to obtain a second frequency domain sequence, and multiplying the element in the frequency domain sequence on the subcarriers of the first bandwidth by an element in a second Gray sequence in a pairwise manner, to obtain a third frequency domain sequence, where any one of a first frequency domain sequence, the second frequency domain sequence, or the third frequency domain sequence is used as the frequency domain sequence on the subcarriers of the second bandwidth, and the first frequency domain sequence includes the element in the frequency domain sequence on the subcarriers of the first bandwidth.

In another possible implementation, the performing phase rotation on a part or all of elements in the frequency domain sequence on the subcarriers of the first bandwidth includes at least one of the following operations: multiplying an element in a frequency domain sequence at an even-numbered subcarrier location of the first bandwidth by −1, i, or −i; multiplying an element in a frequency domain sequence at an odd-numbered subcarrier location of the first bandwidth by −1, i, or −i; or multiplying a frequency domain sequence at each subcarrier location of the first bandwidth by −1, i, or −i.

In another possible implementation, the first Gray sequence and the second Gray sequence are a pair of Gray complementary pair sequences, and elements in the first Gray sequence and the second Gray sequence are all 1 or −1.

In another possible implementation, the method further includes: obtaining the frequency domain sequence on the subcarriers of the first bandwidth in the transmission bandwidth.

In another possible implementation, the transmission bandwidth is 80 MHz, the first bandwidth and the second bandwidth each are 40 MHz, and the first bandwidth is divided by using a subcarrier frequency domain resource block of a resource unit RU 484; the transmission bandwidth is 160 MHz, the first bandwidth and the second bandwidth each are 80 MHz, and the first bandwidth is divided by using a subcarrier frequency domain resource block of an RU 996; or the transmission bandwidth is 320 MHz, the first bandwidth and the second bandwidth each are 160 MHz, and the first bandwidth is divided by using a subcarrier frequency domain resource block of an RU 2×996.

According to a second aspect, a data receiving method is provided. The method includes: receiving a time domain signal sent on a transmission bandwidth; transforming the time domain signal into a frequency domain, to obtain a frequency domain sequence on subcarriers of the transmission bandwidth, where the frequency domain sequence on the subcarriers of the transmission bandwidth includes a frequency domain sequence on subcarriers of a first bandwidth and a frequency domain sequence on subcarriers of a second bandwidth, and the frequency domain sequence on the subcarriers of the second bandwidth is obtained by performing a non-replication operation on the frequency domain sequence on the subcarriers of the first bandwidth; and restoring the frequency domain sequence on the subcarriers of the second bandwidth.

In a possible implementation, the restoring the frequency domain sequence on the subcarriers of the second bandwidth includes at least one of the following operations: reversely arranging, based on an arrangement of the frequency domain sequence on the subcarriers of the first bandwidth, the frequency domain sequence on the subcarriers of the second bandwidth after conjugation; performing corresponding phase rotation on a part or all of elements in the frequency domain sequence on the subcarriers of the second bandwidth; if the frequency domain sequence on the subcarriers of the second bandwidth at a transmit end is obtained by multiplying an element in a first frequency domain sequence corresponding to the frequency domain sequence on the subcarriers of the first bandwidth by an element in a first Gray sequence in a pairwise manner, and elements in the first Gray sequence are all 1 or −1, multiplying a corresponding element in the frequency domain sequence on the subcarriers of the second bandwidth at a receive end by a corresponding element in the first Gray sequence to obtain a restored frequency domain sequence on the second bandwidth; or if the frequency domain sequence on the subcarriers of the second bandwidth at a transmit end is obtained by multiplying an element in a first frequency domain sequence corresponding to the frequency domain sequence on the subcarriers of the first bandwidth by an element in a second Gray sequence in a pairwise manner, and elements in the second Gray sequence are all 1 or −1, using, as a restored frequency domain sequence on the subcarriers of the second bandwidth, a sequence obtained by multiplying an element in the frequency domain sequence on the subcarriers of the second bandwidth at a receive end by an element in the second Gray sequence in a pairwise manner.

In another possible implementation, the performing corresponding phase rotation on a part or all of elements in the frequency domain sequence on the subcarriers of the second bandwidth includes at least one of the following operations: if an element in a frequency domain sequence corresponding to an even-numbered subcarrier location of the second bandwidth is obtained by multiplying an element in a frequency domain sequence at an even-numbered subcarrier location of the first bandwidth by −1, i, or −i, multiplying the element in the frequency domain sequence corresponding to the even-numbered subcarrier location of the second bandwidth by −1, −i, or i; if a frequency domain sequence at an odd-numbered subcarrier location of the second bandwidth is obtained by multiplying a frequency domain sequence at an odd-numbered subcarrier location of the first bandwidth by −1, i, or −i, multiplying an element in the frequency domain sequence corresponding to the odd-numbered subcarrier location of the second bandwidth by −1, −i or i; or if a frequency domain sequence at each subcarrier location of the second bandwidth is obtained by multiplying a frequency domain sequence at each subcarrier location of the first bandwidth by −1, i, or −i, multiplying the frequency domain sequence at each subcarrier location of the second bandwidth by −1, −i, or i.

In another possible implementation, the first Gray sequence and the second Gray sequence are a pair of Gray complementary pair sequences.

In another possible implementation, the transmission bandwidth is 80 MHz, the first bandwidth and the second bandwidth each are 40 MHz, and the first bandwidth is divided by using a subcarrier frequency domain resource block of a resource unit RU 484; the transmission bandwidth is 160 MHz, the first bandwidth and the second bandwidth each are 80 MHz, and the first bandwidth is divided by using a subcarrier frequency domain resource block of an RU 996; or the transmission bandwidth is 320 MHz, the first bandwidth and the second bandwidth each are 160 MHz, and the first bandwidth is divided by using a subcarrier frequency domain resource block of an RU 2×996.

According to a third aspect, a data sending apparatus is provided.

In a possible implementation, the data sending apparatus may be an information transmission device. The data sending apparatus includes a processor. The processor is configured to control and manage an action of the data sending apparatus. For example, the processor is configured to: support the data sending apparatus in performing a non-replication operation on a frequency domain sequence on subcarriers of a first bandwidth in a transmission bandwidth, to obtain a frequency domain sequence on subcarriers of a second bandwidth in the transmission bandwidth, where the subcarrier includes a data subcarrier and a pilot subcarrier; and transform the frequency domain sequences on the subcarriers of the first bandwidth and the second bandwidth into a time domain, perform radio frequency processing on time domain data and then send the data, and/or perform another technical process described in this specification. Optionally, the data sending apparatus may further include a processor and a memory.

In another possible implementation, the data sending apparatus may be an information transmission board. The data sending apparatus includes a processor. The processor is configured to control and manage an action of the data sending apparatus. For example, the processor is configured to: support the data sending apparatus in performing a non-replication operation on a frequency domain sequence on subcarriers of a first bandwidth in a transmission bandwidth, to obtain a frequency domain sequence on subcarriers of a second bandwidth in the transmission bandwidth, where the subcarrier includes a data subcarrier and a pilot subcarrier; and transform the frequency domain sequences on the subcarriers of the first bandwidth and the second bandwidth into a time domain, perform radio frequency processing on the time domain data and then send the data, and/or perform another technical process described in this specification. Optionally, the data sending apparatus may further include a transceiver and a memory.

In another possible implementation, the data sending apparatus is alternatively implemented by a general-purpose processor, namely, a chip. The general-purpose processor includes a processing circuit. The processing circuit is configured to perform a non-replication operation on a frequency domain sequence on subcarriers of a first bandwidth in a transmission bandwidth, to obtain a frequency domain sequence on subcarriers of a second bandwidth in the transmission bandwidth, where the subcarrier includes a data subcarrier and a pilot subcarrier; and transform the frequency domain sequences on the subcarriers of the first bandwidth and the second bandwidth into a time domain, and perform radio frequency processing on time domain data and then send the data. The general-purpose processor further includes a communication interface.

Optionally, the general-purpose processor may further include a storage medium. The processing circuit communicates with an external device through the communication interface. The communication interface may be an input/output interface, an interface circuit, an output circuit, an input circuit, a pin, a related circuit, or the like in the chip or a chip system. The processor may alternatively be a processing circuit or a logic circuit. The storage medium is configured to store program code. The communication interface is configured to support the data sending apparatus in performing communication. When the program code is executed by the processor, the processor is configured to: perform a non-replication operation on a frequency domain sequence on subcarriers of a first bandwidth in a transmission bandwidth, to obtain a frequency domain sequence on subcarriers of a second bandwidth in the transmission bandwidth, where the subcarrier includes a data subcarrier and a pilot subcarrier; and transform the frequency domain sequences on the subcarriers of the first bandwidth and the second bandwidth into a time domain, and perform radio frequency processing on time domain data and then send the data.

In another possible implementation, the data sending apparatus may alternatively be implemented by using the following: one or more FPGAs, a PLD, a controller, a state machine, a logic gate, a discrete hardware component, any other proper circuit, or any combination of circuits that can perform various functions described in this application.

According to a fourth aspect, a data receiving apparatus is provided.

In a possible implementation, the data receiving apparatus may be an information transmission device. The data receiving apparatus includes a processor and a transceiver. The transceiver is configured to support the data receiving apparatus in performing the step of receiving a time domain signal sent on a transmission bandwidth. The processor is configured to control and manage an action of the data receiving apparatus. For example, the processor is configured to: support the data receiving apparatus in transforming the time domain signal into a frequency domain, to obtain a frequency domain sequence on subcarriers of the transmission bandwidth, where the frequency domain sequence on the subcarriers of the transmission bandwidth includes a frequency domain sequence on subcarriers of a first bandwidth and a frequency domain sequence on subcarriers of a second bandwidth, and the frequency domain sequence on the subcarriers of the second bandwidth is obtained by performing a non-replication operation on the frequency domain sequence on the subcarriers of the first bandwidth; and restore the frequency domain sequence on the subcarriers of the second bandwidth, and/or perform another technical process described in this specification. Optionally, the data receiving apparatus may further include a memory.

In another possible implementation, the data receiving apparatus may be an information transmission board. The data receiving apparatus includes a processor and a transceiver. The transceiver is configured to support the data receiving apparatus in performing the step of receiving a time domain signal sent on a transmission bandwidth. The processor is configured to control and manage an action of the data receiving apparatus. For example, the processor is configured to: support the data receiving apparatus in transforming the time domain signal into a frequency domain, to obtain a frequency domain sequence on subcarriers of the transmission bandwidth, where the frequency domain sequence on the subcarriers of the transmission bandwidth includes a frequency domain sequence on subcarriers of a first bandwidth and a frequency domain sequence on subcarriers of a second bandwidth, and the frequency domain sequence on the subcarriers of the second bandwidth is obtained by performing a non-replication operation on the frequency domain sequence on the subcarriers of the first bandwidth; and restore the frequency domain sequence on the subcarriers of the second bandwidth, and/or perform another technical process described in this specification. Optionally, the data receiving apparatus may further include a memory.

In another possible implementation, the data receiving apparatus is alternatively implemented by a general-purpose processor, namely, a chip. The general-purpose processor includes a processing circuit and a communication interface. The communication interface is configured to receive a time domain signal sent on a transmission bandwidth. The processing circuit is configured to transform the time domain signal into a frequency domain, to obtain a frequency domain sequence on subcarriers of the transmission bandwidth, where the frequency domain sequence on the subcarriers of the transmission bandwidth includes a frequency domain sequence on subcarriers of a first bandwidth and a frequency domain sequence on subcarriers of a second bandwidth, and the frequency domain sequence on the subcarriers of the second bandwidth is obtained by performing a non-replication operation on the frequency domain sequence on the subcarriers of the first bandwidth; and restore the frequency domain sequence on the subcarriers of the second bandwidth. Optionally, the general-purpose processor may further include a storage medium.

The processing circuit communicates with an external device through the communication interface. The communication interface may be an input/output interface, an interface circuit, an output circuit, an input circuit, a pin, a related circuit, or the like in the chip or a chip system. The processor may alternatively be a processing circuit or a logic circuit. The storage medium is configured to store program code. The communication interface is configured to support the data receiving apparatus in performing communication. When the program code is executed by the processor, the processor is configured to: transform the time domain signal into a frequency domain, to obtain a frequency domain sequence on subcarriers of the transmission bandwidth, where the frequency domain sequence on the subcarriers of the transmission bandwidth includes a frequency domain sequence on subcarriers of a first bandwidth and a frequency domain sequence on subcarriers of a second bandwidth, and the frequency domain sequence on the subcarriers of the second bandwidth is obtained by performing a non-replication operation on the frequency domain sequence on the subcarriers of the first bandwidth; and restore the frequency domain sequence on the subcarriers of the second bandwidth.

In another possible implementation, the data receiving apparatus may alternatively be implemented by using the following: one or more FPGAs, a PLD, a controller, a state machine, a logic gate, a discrete hardware component, any other proper circuit, or any combination of circuits that can perform various functions described in this application.

According to a fifth aspect, a computer-readable storage medium is provided. The computer-readable storage medium stores instructions. When the instructions are run on a computer, the computer is enabled to perform the data sending method provided in any one of the first aspect or the possible implementations of the first aspect.

According to a sixth aspect, a computer-readable storage medium is provided. The computer-readable storage medium stores instructions. When the instructions are run on a computer, the computer is enabled to perform the data receiving method provided in any one of the second aspect or the possible implementations of the second aspect.

According to a seventh aspect, a computer program product including instructions is provided. When the computer program product is run on a computer, the computer is enabled to perform the data sending method provided in any one of the first aspect or the possible implementations of the first aspect.

According to an eighth aspect, a computer program product including instructions is provided. When the computer program product is run on a computer, the computer is enabled to perform the data receiving method provided in any one of the second aspect or the possible implementations of the second aspect.

It may be understood that any one of the data sending and receiving apparatus, the computer storage medium, or the computer program product provided above is configured to perform the corresponding method provided above. Therefore, for beneficial effects of the data sending and receiving apparatus, the computer storage medium, or the computer program product, refer to the beneficial effects in the corresponding method provided above. Details are not described herein again.

DESCRIPTION OF EMBODIMENTS

The following describes the technical solutions in embodiments of this application with reference to the accompanying drawings in embodiments of this application.

It should be understood that, embodiments of this application may be applied to various communication systems, for example, a global system for mobile communication (global system for mobile communication, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communication system, a 5G communication system, and a future 6G communication system.

It should be further understood that embodiments of this application may be further applied to various non-orthogonal multiple access technology-based communication systems, for example, a sparse code multiple access (sparse code multiple access, SCMA) system. Certainly, SCMA may also be referred to as another name in the communication field. Further, the technical solutions in embodiments of this application may be applied to a multi-carrier transmission system using the non-orthogonal multiple access technology, for example, an orthogonal frequency division multiplexing (orthogonal frequency division multiplexing, OFDM) system using the non-orthogonal multiple access technology, a filter bank multi-carrier (filter bank multi-carrier, FBMC) system, a generalized frequency division multiplexing (generalized frequency division multiplexing, GFDM) system, and a filtered-orthogonal frequency division multiplexing (filtered-OFDM, F-OFDM) system.

It should be further understood that, embodiments of this application may be applied to an LTE system, a 5G system and a subsequent evolved system such as 6G or other wireless communication systems using various radio access technologies, for example, systems using access technologies such as code division multiple access, frequency division multiple access, time division multiple access, orthogonal frequency division multiple access, and single-carrier frequency division multiple access, and particularly applicable to a scenario in which a channel information feedback is required and/or a two-stage precoding technology is used, for example, a wireless network using a massive MIMO technology or a wireless network using a distributed antenna technology.

Figure 1:
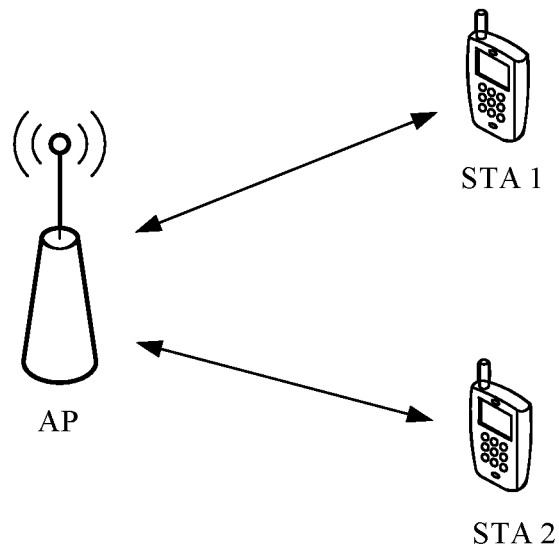
FIG. 1 is a schematic diagram of a structure of a communication system according to an embodiment of this application.

It should also be understood that embodiments of this application may be applied to Wi-Fi wireless communication. A Wi-Fi wireless communication system includes an access point (access point, AP) and a station (station, STA). The station may also be referred to as a site. Related wireless communication scenarios may include communication between an AP and a STA, communication between APs, communication between STAs, and the like. In embodiments of this application, communication between an AP and a STA is used as an example for description. As shown in FIG. 1, an AP performs wireless communication with a STA 1 and a STA 2. It should be understood that a method described in embodiments of this application is also applicable to communication between APs, communication between STAs, and the like.

In embodiments of this application, if a transmit device may be an AP, a receive device may be a STA. If a transmit device may be a STA, a receive device may be an AP.

An embodiment of this application provides data sending and receiving methods and apparatuses. A transmit device performs a non-replication operation on a frequency domain sequence on subcarriers of a first bandwidth, to obtain a frequency domain sequence on subcarriers of a second bandwidth in a transmission bandwidth, transforms the frequency domain sequences on the subcarriers of the first bandwidth and the second bandwidth into a time domain, and performs radio frequency processing on time domain data and then sends the data. In this way, different signals are transmitted on the first bandwidth and the second bandwidth. This can reduce a PAPR of the transmit device, improve system performance, and improve communication reliability.

Figure 2:
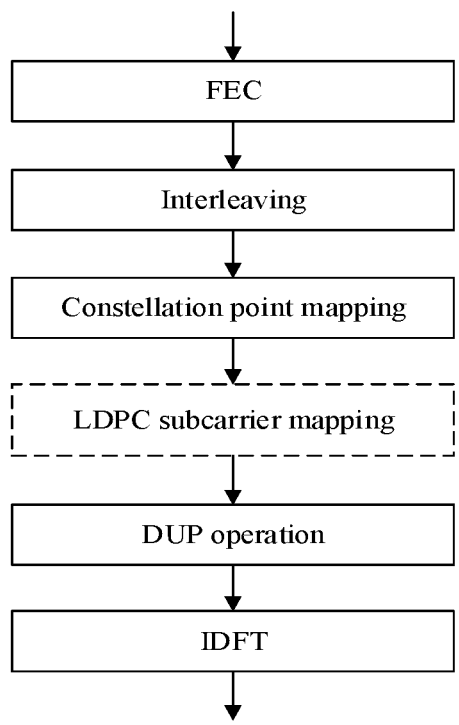
FIG. 2 is a schematic flowchart of example signal processing of a transmit device according to an embodiment of this application.

FIG. 2 is a schematic flowchart of example signal processing of a transmit device according to an embodiment of this application. Before sending a signal, the transmit device may perform the following processing on the signal: encoding to-be-sent data, for example, encoding by using a forward error correction (forward error correction, FEC) technology; interleaving encoded data, for example, interleaving the encoded data by using convolutional code; modulating the interleaved data, for example, performing dual-carrier modulation (dual carrier modulation, DCM), or performing modulation in another conventional manner; performing low-density parity-check (low density parity check, LDPC) code carrier mapping, where this step is optional, and is represented by a dashed line in the figure, and the LDPC code carrier mapping is to map a data symbol to different locations; generating a pilot value on a corresponding pilot subcarrier according to a bandwidth and an OFDM symbol number; and after the foregoing processing, obtaining a frequency domain sequence on subcarriers of a first partial bandwidth (briefly referred to as a "first bandwidth") in a transmission bandwidth. Then, DUP operation processing is performed on the frequency domain sequence on the subcarriers of the first bandwidth, to obtain a frequency domain sequence on subcarriers of a second partial bandwidth (briefly referred to as a "second bandwidth") in the transmission bandwidth. The DUP operation does not simply replicate the frequency domain sequence on the subcarriers of the first bandwidth. The DUP operation is described in detail below. The frequency domain sequence on the subcarriers of the first bandwidth and the frequency domain sequence on the subcarriers of the second bandwidth are concatenated to obtain a frequency domain sequence on the subcarriers of the entire transmission bandwidth. Inverse discrete Fourier transform (inverse discrete Fourier transform, IDFT) is performed on the frequency domain sequence on the subcarriers of the entire transmission bandwidth. The frequency domain sequence on the entire transmission bandwidth is transformed into a time domain, and then radio frequency processing is performed on time domain data, and then the data is sent.

The DCM sends data by grouping the data and mapping the data to a pair of constellation points. During demodulation, a log likelihood ratio (log likelihood ratio, LLR) technology is usually used to combine the constellation points for demodulation.

This embodiment of this application improves the DUP operation in FIG. 2, and provides data sending and receiving solutions. This solution includes: The transmit device performs a non-replication operation on a frequency domain sequence on subcarriers of a first bandwidth in a transmission bandwidth, to obtain a frequency domain sequence on subcarriers of a second bandwidth in the transmission bandwidth, where the subcarrier includes a data subcarrier and a pilot subcarrier; and transforms the frequency domain sequences on the subcarriers of the first bandwidth and the second bandwidth into a time domain, and performs radio frequency processing on time domain data and then sends the data.

A receive device receives a time domain signal sent on the transmission bandwidth; transforms the time domain signal into a frequency domain, to obtain a frequency domain sequence on subcarriers of the transmission bandwidth, where the frequency domain sequence on the subcarriers of the transmission bandwidth includes the frequency domain sequence on the subcarriers of the first bandwidth and the frequency domain sequence on the subcarriers of the second bandwidth, and the frequency domain sequence on the subcarriers of the second bandwidth is obtained by performing a non-replication operation on the frequency domain sequence on the subcarriers of the first bandwidth; and restores the frequency domain sequence on the subcarriers of the second bandwidth.

The foregoing data sending and receiving solutions reduce a PAPR of the transmit device, improves system performance, and improves communication reliability.

The non-replication operation is performed on the frequency domain sequence on the subcarriers of the first bandwidth in the transmission bandwidth, to obtain the frequency domain sequence on the subcarriers of the second bandwidth in the transmission bandwidth. The non-replication operation includes at least one of the following operations:

(1) reversely arranging, based on an arrangement of the frequency domain sequence on the subcarriers of the first bandwidth, the frequency domain sequence on the subcarriers of the first bandwidth after conjugation; or (2) performing phase rotation on a part or all of elements in the frequency domain sequence on the subcarriers of the first bandwidth.

The following describes the non-replication operation in detail in Embodiment 1.

In addition, the non-replication operation is performed on the frequency domain sequence on the subcarriers of the first bandwidth in the transmission bandwidth, to obtain the frequency domain sequence on the subcarriers of the second bandwidth in the transmission bandwidth. The non-replication operation further includes:

multiplying an element in the frequency domain sequence on the subcarriers of the first bandwidth by an element in a first Gray sequence in a pairwise manner, to obtain a second frequency domain sequence, and multiplying the element in the frequency domain sequence on the subcarriers of the first bandwidth by an element in a second Gray sequence in a pairwise manner, to obtain a third frequency domain sequence, where any one of a first frequency domain sequence, the second frequency domain sequence, or the third frequency domain sequence is used as the frequency domain sequence on the subcarriers of the second bandwidth, and the first frequency domain sequence includes the element in the frequency domain sequence on the subcarriers of the first bandwidth. The following describes the non-replication operation in detail in Embodiment 2.

Embodiment 1

Figure 3:
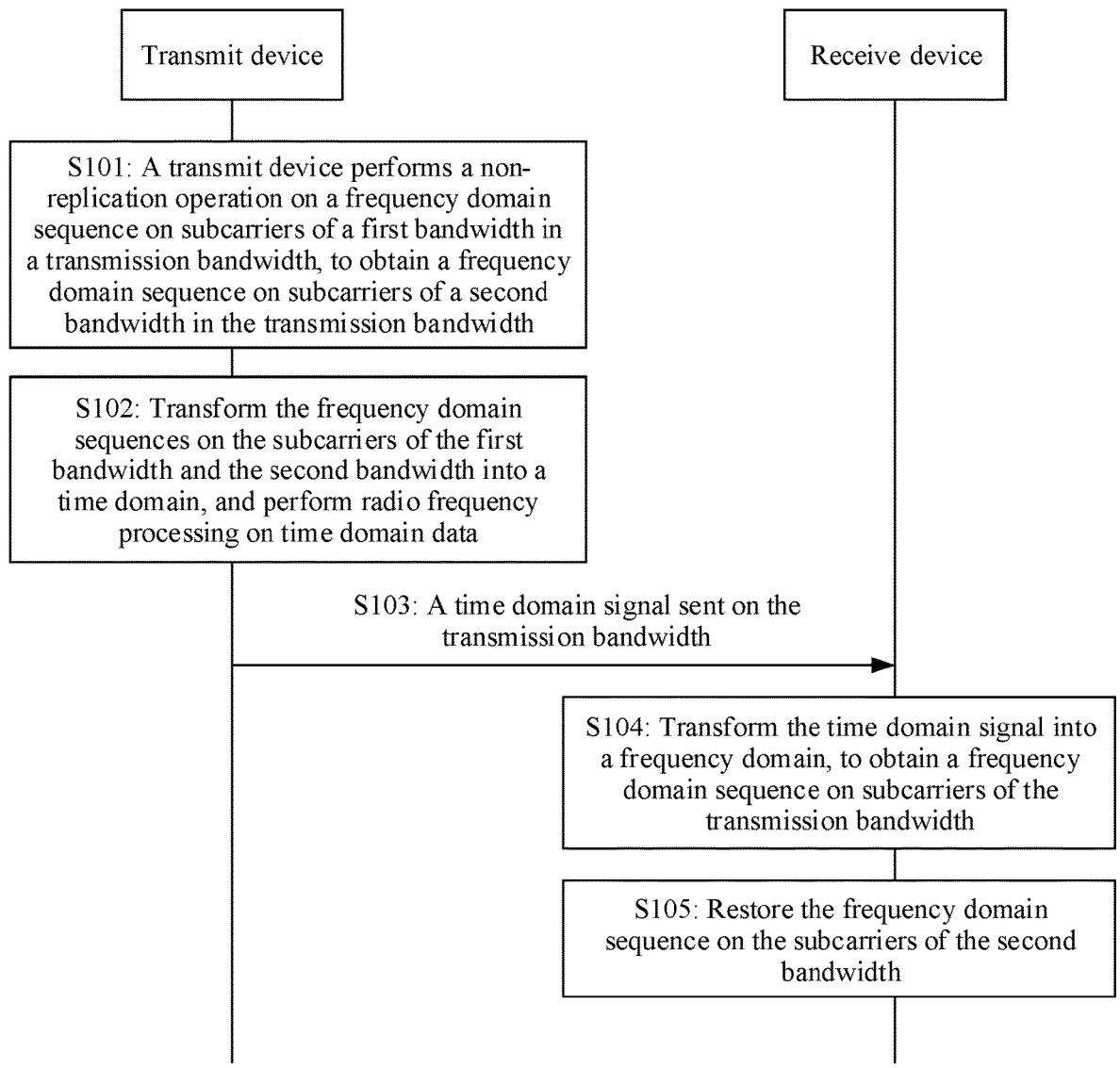
FIG. 3 is a schematic flowchart of data sending and receiving methods according to an embodiment of this application.

FIG. 3 is a schematic flowchart of data sending and receiving methods according to an embodiment of this application. The method may include the following steps.

S101: A transmit device performs a non-replication operation on a frequency domain sequence on subcarriers of a first bandwidth in a transmission bandwidth, to obtain a frequency domain sequence on subcarriers of a second bandwidth in the transmission bandwidth.

For example, the first bandwidth may be a half of the transmission bandwidth.

Figure 4:
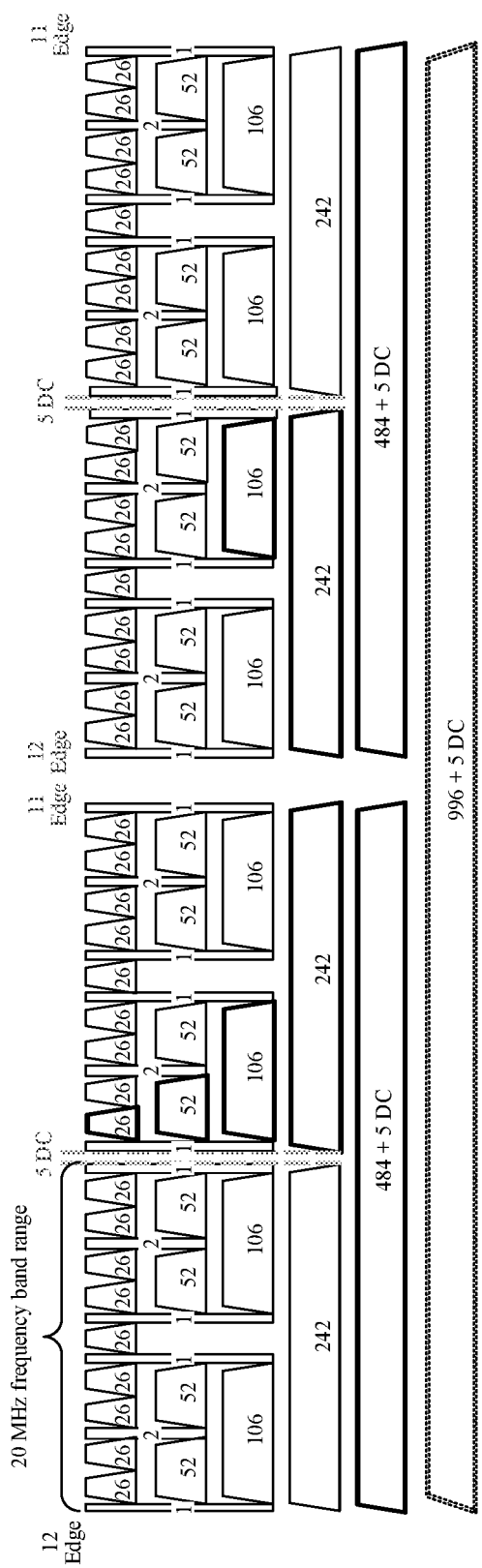
FIG. 4 is a schematic diagram of resource unit division in an 80 MHz bandwidth.

FIG. 4 is a schematic diagram of resource unit division in an 80 MHz bandwidth. When a bandwidth is 80 MHz, the entire bandwidth may include an entire 996-tone RU, or may include various combinations of a 26-tone RU, a 52-tone RU, a 106-tone RU, a 242-tone RU, and a 484-tone RU. In addition to the RUs for data transmission, some guard (guard) subcarriers, null subcarriers, or direct current (direct current, DC) subcarriers are further included. When the transmission bandwidth is 80 MHz, the first bandwidth may be 40 MHz, and the subcarriers of the first bandwidth are divided in a manner of RU 484.

When a bandwidth is 160 MHz or 80+80 MHz, the entire bandwidth may be considered as two replications of an 80 MHz tone plan. The entire bandwidth may include an entire 2×996-tone RU, or may include various combinations of a 26-tone RU, a 52-tone RU, a 106-tone RU, a 242-tone RU, a 484-tone RU, and a 996-tone RU. When the transmission bandwidth is 160 MHz or 80+80 MHz, the first bandwidth may be 80 MHZ, and the subcarriers of the first bandwidth are divided in a manner of RU 996.

When a bandwidth is 320 MHz or 160+160 MHZ, the entire bandwidth may be considered as four replications of an 80 MHz tone plan. When the first bandwidth may be 160 MHz, subcarriers on the first bandwidth are divided in a manner of RU 2×996.

In this embodiment, the transmit device performs the non-replication operation on the frequency domain sequence on the subcarriers of the first bandwidth in the transmission bandwidth, and the obtained frequency domain sequence on the subcarriers of the second bandwidth in the transmission bandwidth is not completely the same as the frequency domain sequence on the subcarriers of the first bandwidth.

Specifically, the non-replication operation may include the following implementations A to D.

In an implementation A, the performing a non-replication operation on a frequency domain sequence on subcarriers of a first bandwidth in a transmission bandwidth includes: reversely arranging, based on an arrangement of the frequency domain sequence on the subcarriers of the first bandwidth, the frequency domain sequence on the subcarriers of the first bandwidth after conjugation.

Specifically, elements in the frequency domain sequence on the subcarriers of the first bandwidth may be conjugated, and then the frequency domain sequence on the subcarriers of the first bandwidth obtained through the conjugation is reversely arranged; or the frequency domain sequence on the subcarriers of the first bandwidth is reversely arranged, and then the frequency domain sequence on the subcarriers of the first bandwidth obtained through the reverse arrangement is conjugated. For example, the frequency domain sequence on the subcarriers of the first bandwidth is $b_1, b_2, \ldots, b_{k-1}$, and $b_k$, and the frequency domain sequence on the subcarriers of the first bandwidth obtained through the conjugation is $a_1, a_2, \ldots, a_{k-1}$, and $a_k$. In this case, the frequency domain sequence on the subcarriers of the first bandwidth obtained through the conjugation is reversely arranged to $a_k, a_{k-1}, \ldots, a_2$, and $a_1$.

In an implementation B, the performing a non-replication operation on a frequency domain on subcarriers of a first bandwidth in a transmission bandwidth includes: performing phase rotation on a part or all of elements in the frequency domain sequence on the subcarriers of the first bandwidth.

Specifically, the following solutions B1 to B9 are included.

Solution B1: An element in a frequency domain sequence at an even-numbered subcarrier location of the first bandwidth is multiplied by −1. In other words, a phase of the element in the frequency domain sequence at the even-numbered subcarrier location of the first bandwidth is rotated by 180 degrees, to obtain the frequency domain sequence on the subcarriers of the second bandwidth in the transmission bandwidth. After phase rotation, the frequency domain sequence on the subcarriers of the second bandwidth is no longer completely the same as the frequency domain sequence on the subcarriers of the first bandwidth. This reduces a PAPR of the transmit device.

For example, the transmission bandwidth may be 80 MHz. It is assumed that a frequency domain sequence of a 40 MHz bandwidth (RU 484) is generated through DCM. An element in a frequency domain sequence corresponding to an even-numbered subcarrier location of the 40 MHz bandwidth is multiplied by −1 (in other words, a phase is rotated by 180 degrees), to obtain a frequency domain sequence in another half 40 MHz bandwidth of the 80 MHz.

Figure 5:
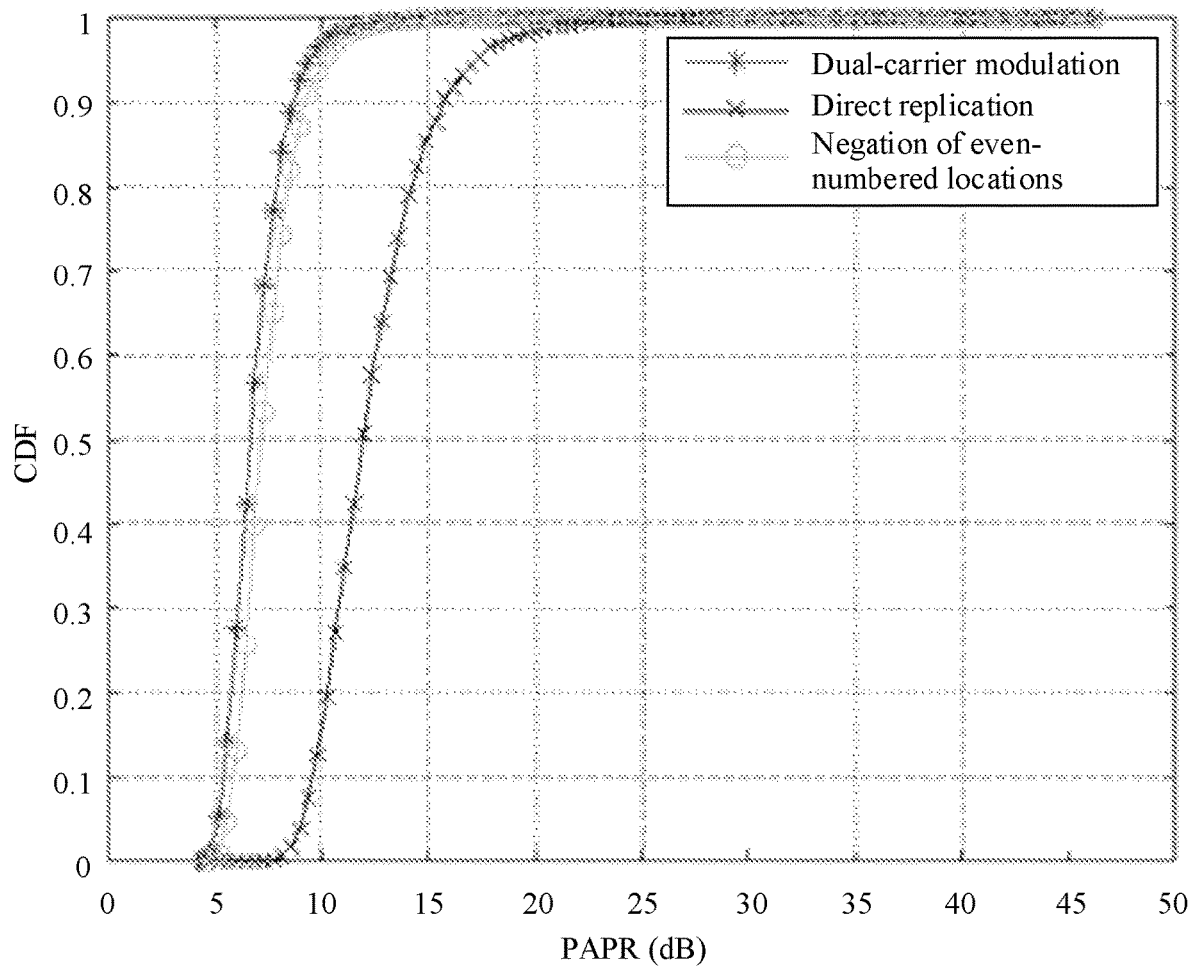
FIG. 5 is a schematic diagram of an example of a PAPR simulation result in an 80 MHz bandwidth by using a DUP mode in which a phase of an even-numbered subcarrier location is rotated by 180 degrees after reversal in this embodiment.

FIG. 5 is a schematic diagram of an example of a PAPR simulation result in an 80 MHz bandwidth by using a DUP mode in which a phase of an element in a frequency domain sequence corresponding to an even-numbered subcarrier location is rotated by 180 degrees in this embodiment. It may be learned that, compared with a PAPR of the directly-replicated frequency domain sequence on the subcarriers of the first bandwidth, a PAPR of the frequency domain sequence on the subcarriers of the second bandwidth obtained through phase rotation processing is obviously reduced.

For example, the transmission bandwidth may be 160 MHz. It is assumed that a frequency domain sequence of an 80 MHz bandwidth (RU 996) is generated through DCM. An element in a frequency domain sequence corresponding to an even-numbered subcarrier location of the 80 MHz bandwidth is multiplied by −1 (in other words, a phase is rotated by 180 degrees), to obtain a frequency domain sequence in another half 80 MHz bandwidth of the 160 MHz.

Figure 6:
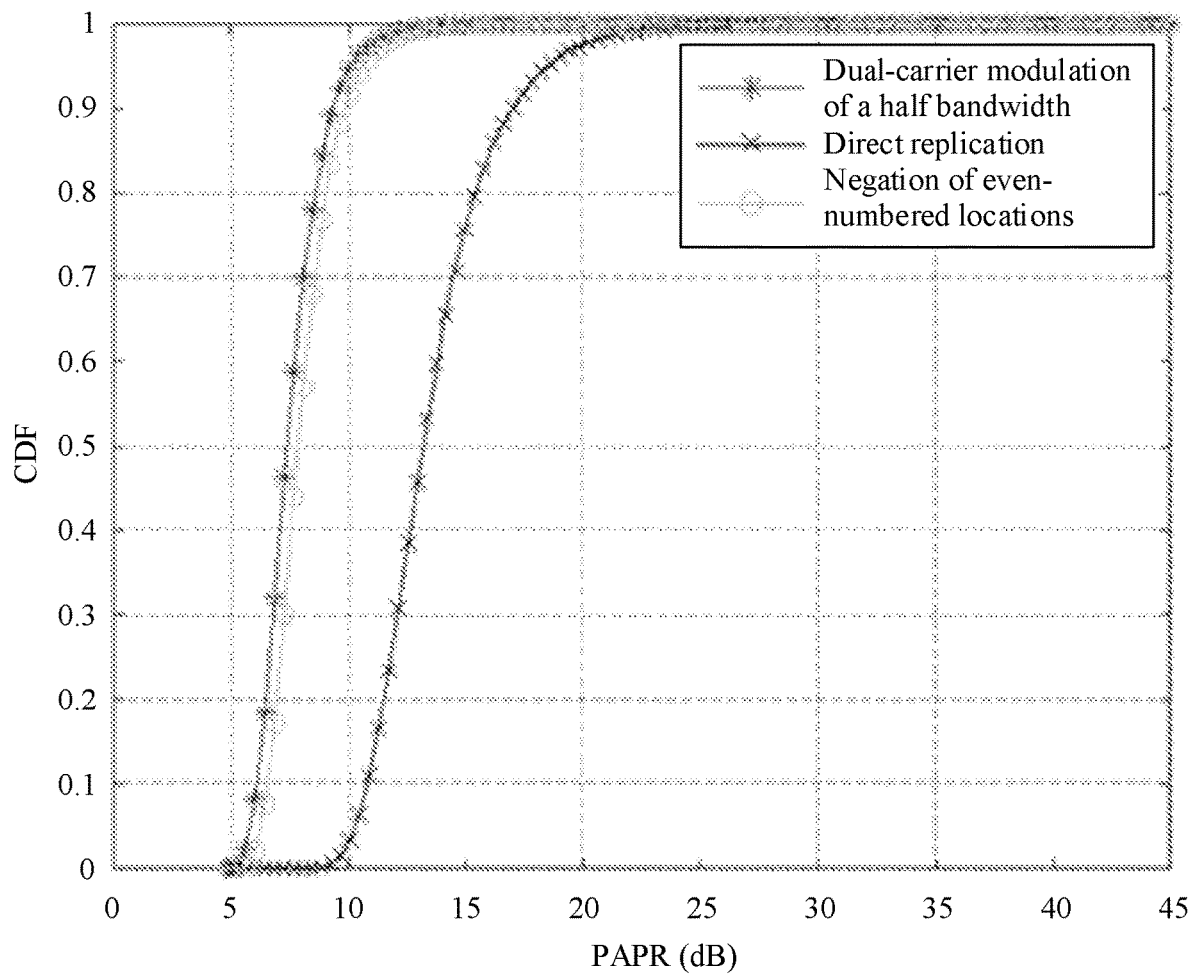
FIG. 6 is a schematic diagram of an example of a PAPR simulation result in a 160 MHz bandwidth in a DUP mode in which a phase of an even-numbered subcarrier location is rotated by 180 degrees after reversal in this embodiment.

FIG. 6 is a schematic diagram of an example of a PAPR simulation result in a 160 MHz bandwidth by using a DUP mode in which a phase of an even-numbered subcarrier location is rotated by 180 degrees in this embodiment. It may be learned that, compared with a PAPR of the directly-replicated frequency domain sequence on the subcarriers of the first bandwidth, a PAPR of the frequency domain sequence on the subcarriers of the second bandwidth obtained through phase rotation processing is obviously reduced.

Solution B2: An element in a frequency domain sequence at an even-numbered subcarrier location of the first bandwidth is multiplied by i. In other words, a phase of the element in the frequency domain sequence corresponding to the even-numbered subcarrier location of the first bandwidth is rotated by 90 degrees, to obtain the frequency domain sequence on the subcarriers of the second bandwidth in the transmission bandwidth.

Solution B3: An element in a frequency domain sequence at an even-numbered subcarrier location of the first bandwidth is multiplied by −i. In other words, a phase of the element in the frequency domain sequence corresponding to the even-numbered subcarrier location of the first bandwidth is rotated by 270 degrees, to obtain the frequency domain sequence on the subcarriers of the second bandwidth in the transmission bandwidth.

Solution B4: A frequency domain sequence at an odd-numbered subcarrier location of the first bandwidth is multiplied by −1. In other words, a phase of the frequency domain sequence at the odd-numbered subcarrier location of the first bandwidth is rotated by 180 degrees, to obtain the frequency domain sequence on the subcarriers of the second bandwidth in the transmission bandwidth. After phase rotation, the frequency domain sequence on the subcarriers of the second bandwidth is no longer completely the same as the frequency domain sequence on the subcarriers of the first bandwidth. This reduces a PAPR of the transmit device.

Solution B5: A frequency domain sequence at an odd-numbered subcarrier location of the first bandwidth is multiplied by i. In other words, a phase of the frequency domain sequence at the odd-numbered subcarrier location of the first bandwidth is rotated by 90 degrees, to obtain the frequency domain sequence on the subcarriers of the second bandwidth in the transmission bandwidth.

Solution B6: A frequency domain sequence at an odd-numbered subcarrier location of the first bandwidth is multiplied by −i. In other words, a phase of the frequency domain sequence at the odd-numbered subcarrier location of the first bandwidth is rotated by 270 degrees, to obtain the frequency domain sequence on the subcarriers of the second bandwidth in the transmission bandwidth.

Solution B7: A frequency domain sequence at each subcarrier location of the first bandwidth is multiplied by −1. In other words, a phase of the frequency domain sequence at each subcarrier location of the first bandwidth is rotated by 180 degrees, to obtain the frequency domain sequence on the subcarriers of the second bandwidth in the transmission bandwidth. After phase rotation, the frequency domain sequence on the subcarriers of the second bandwidth is no longer completely the same as the frequency domain sequence on the subcarriers of the first bandwidth. This reduces a PAPR of the transmit device.

Solution B8: A frequency domain sequence at each subcarrier location of the first bandwidth is multiplied by i. In other words, a phase of the frequency domain sequence at each subcarrier location of the first bandwidth is rotated by 90 degrees, to obtain the frequency domain sequence on the subcarriers of the second bandwidth in the transmission bandwidth.

Solution B9: A frequency domain sequence at each subcarrier location of the first bandwidth is multiplied by −i. In other words, a phase of the frequency domain sequence at each subcarrier location of the first bandwidth is rotated by 270 degrees, to obtain the frequency domain sequence on the subcarriers of the second bandwidth in the transmission bandwidth.

In an implementation C, the performing a non-replication operation on a frequency domain sequence on subcarriers of a first bandwidth in a transmission bandwidth includes: reversely arranging, based on an arrangement of the frequency domain sequence on the subcarriers of the first bandwidth, the frequency domain sequence on the subcarriers of the first bandwidth after conjugation, and then performing phase rotation on a part or all of elements in the frequency domain sequence on the subcarriers of the first bandwidth after conjugation and reverse arrangement.

Specifically, the following solutions C1 to C9 are included.

Solution C1: Based on an arrangement of the frequency domain sequence on the subcarriers of the first bandwidth, the frequency domain sequence on the subcarriers of the first bandwidth are reversely arranged after conjugation. Then, a frequency domain sequence at an even-numbered subcarrier location of the first bandwidth obtained through conjugation and reverse arrangement is multiplied by −1. In other words, a phase of the frequency domain sequence at the even-numbered subcarrier location of the first bandwidth obtained through conjugation and reverse arrangement is rotated by 180 degrees, to obtain the frequency domain sequence on the subcarriers of the second bandwidth in the transmission bandwidth. After conjugation, reverse arrangement, and phase rotation, the frequency domain sequence on the subcarriers of the second bandwidth is no longer completely the same as the frequency domain sequence on the subcarriers of the first bandwidth. This reduces a PAPR of the transmit device.

For example, the transmission bandwidth may be 80 MHz. It is assumed that a frequency domain sequence of a 40 MHz bandwidth is generated through DCM. The obtained frequency domain sequence on the subcarriers of the 40 MHz bandwidth is reversely arranged after conjugation. Then, the frequency domain sequence at an even-numbered subcarrier location of the 40 MHz bandwidth obtained through modulation, conjugation, and reverse arrangement is multiplied by −1 (in other words, a phase is rotated by 180 degrees), to obtain a frequency domain sequence in another half 40 MHz bandwidth of the 80 MHz.

Figure 7:
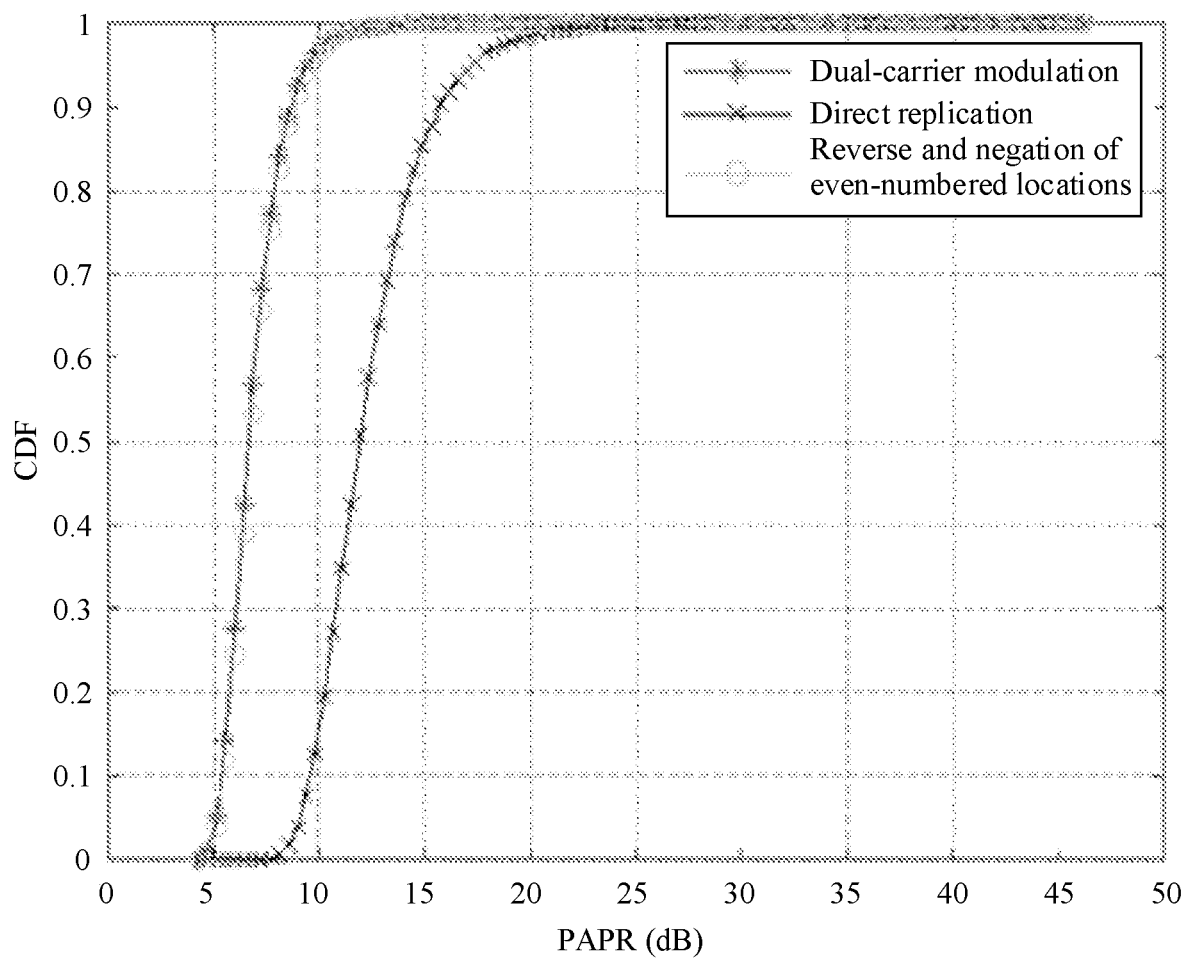
FIG. 7 is a schematic diagram of an example of a PAPR simulation result in an 80 MHz bandwidth in a DUP mode in which a phase of an even-numbered subcarrier location is rotated by 180 degrees in this embodiment.

FIG. 7 is a schematic diagram of an example of a PAPR simulation result in an 80 MHz bandwidth by using a DUP mode in which a phase of an even-numbered subcarrier location is rotated by 180 degrees after conjugation and reverse arrangement in this embodiment. It may be learned that, compared with a PAPR of the directly-replicated frequency domain sequence on the subcarriers of the first bandwidth, a PAPR of the frequency domain sequence on the subcarriers of the second bandwidth obtained through reverse arrangement and phase rotation processing is obviously reduced.

For example, the transmission bandwidth may be 160 MHz. It is assumed that a frequency domain sequence of an 80 MHz bandwidth is generated through DCM. The obtained frequency domain sequence on the 80 MHz bandwidth is reversely arranged after conjugation. Then, the frequency domain sequence at an even-numbered subcarrier location of the 80 MHz bandwidth obtained through modulation, conjugation, and reverse arrangement is multiplied by −1 (in other words, a phase is rotated by 180 degrees), to obtain a frequency domain sequence in another half 80 MHz bandwidth of the 160 MHz.

Figure 8:
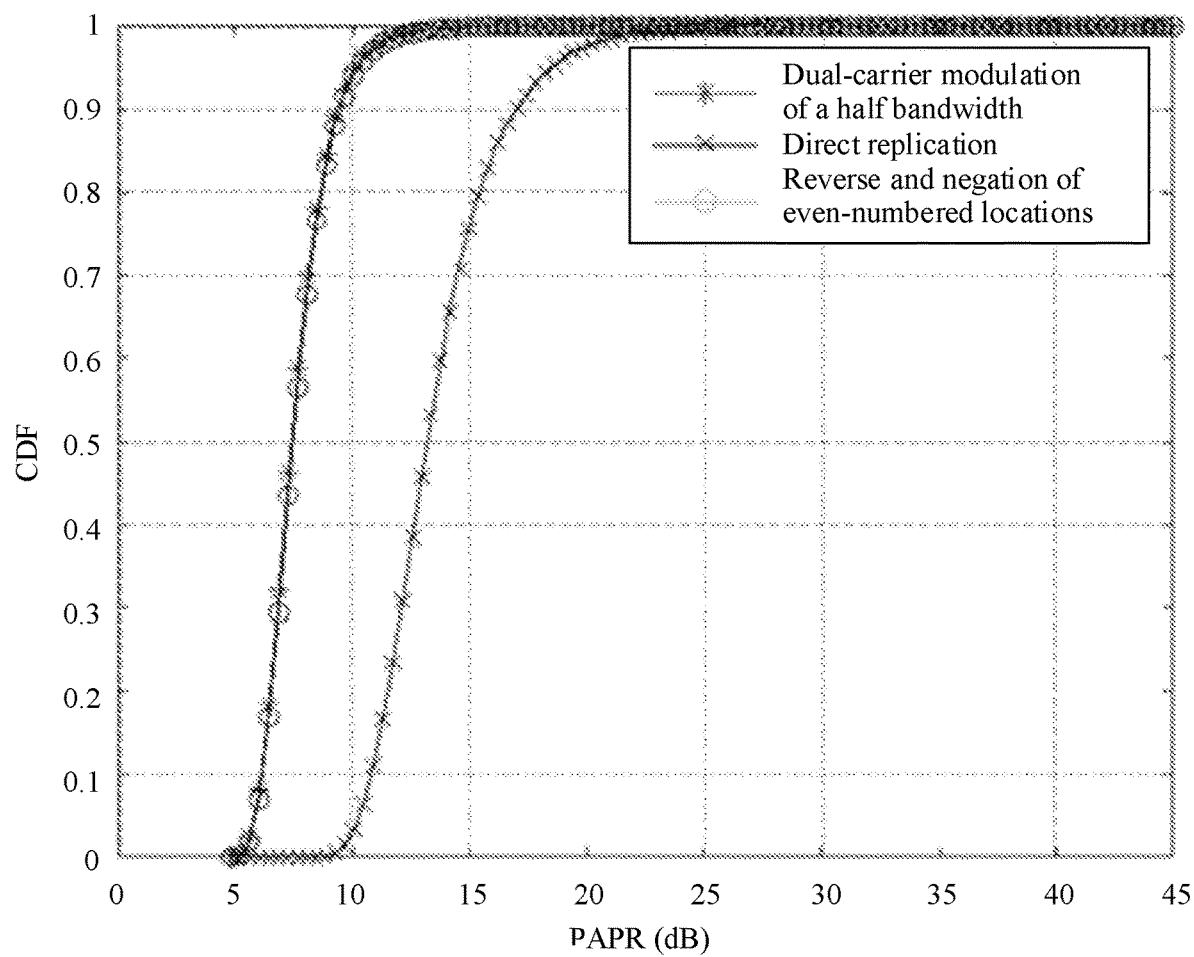
FIG. 8 is a schematic diagram of an example of a PAPR simulation result in a 160 MHz bandwidth in a DUP mode in which a phase of an even-numbered subcarrier location is rotated by 180 degrees in this embodiment.

FIG. 8 is a schematic diagram of an example of a PAPR simulation result in a 160 MHz bandwidth by using a DUP mode in which a phase of an even-numbered subcarrier location is rotated by 180 degrees after conjugation and reverse arrangement in this embodiment. It may be learned that, compared with a PAPR of the directly-replicated frequency domain sequence on the subcarriers of the first bandwidth, a PAPR of the frequency domain sequence on the subcarriers of the second bandwidth obtained through reverse arrangement and phase rotation processing is obviously reduced.

For example, the transmission bandwidth may be 320 MHz. It is assumed that a frequency domain sequence of a 160 MHz bandwidth is generated through DCM. The obtained frequency domain sequence on the 160 MHz bandwidth is reversely arranged after conjugation. Then, the frequency domain sequence at an even-numbered subcarrier location of the 160 MHz bandwidth obtained through modulation, conjugation, and reverse arrangement is multiplied by −1 (in other words, a phase is rotated by 180 degrees), to obtain a frequency domain sequence in another half 160 MHz bandwidth of the 320 MHz.

Solution C2: Based on an arrangement of the frequency domain sequence on the subcarriers of the first bandwidth, the frequency domain sequence on the subcarriers of the first bandwidth are reversely arranged after conjugation. Then, a frequency domain sequence at an even-numbered subcarrier location of the first bandwidth obtained through conjugation and reverse arrangement is multiplied by i. In other words, a phase of the frequency domain sequence at the even-numbered subcarrier location of the first bandwidth obtained through conjugation and reverse arrangement is rotated by 90 degrees, to obtain the frequency domain sequence on the subcarriers of the second bandwidth in the transmission bandwidth.

Solution C3: Based on an arrangement of the frequency domain sequence on the subcarriers of the first bandwidth, the frequency domain sequence on the subcarriers of the first bandwidth are reversely arranged after conjugation. Then, a frequency domain sequence at an even-numbered subcarrier location of the first bandwidth obtained through conjugation and reverse arrangement is multiplied by −i. In other words, a phase of the frequency domain sequence at the even-numbered subcarrier location of the first bandwidth obtained through conjugation and reverse arrangement is rotated by 270 degrees, to obtain the frequency domain sequence on the subcarriers of the second bandwidth in the transmission bandwidth.

Solution C4: Based on an arrangement of the frequency domain sequence on the subcarriers of the first bandwidth, the frequency domain sequence on the subcarriers of the first bandwidth are reversely arranged after conjugation. Then, a frequency domain sequence at an odd-numbered subcarrier location of the first bandwidth obtained through conjugation and reverse arrangement is multiplied by −1. In other words, a phase of the frequency domain sequence at the odd-numbered subcarrier location of the first bandwidth is rotated by 180 degrees, to obtain the frequency domain sequence on the subcarriers of the second bandwidth in the transmission bandwidth.

Solution C5: Based on an arrangement of the frequency domain sequence on the subcarriers of the first bandwidth, the frequency domain sequence on the subcarriers of the first bandwidth are reversely arranged after conjugation. Then, a frequency domain sequence at an odd-numbered subcarrier location of the first bandwidth obtained through conjugation and reverse arrangement is multiplied by i. In other words, a phase of the frequency domain sequence at the odd-numbered subcarrier location of the first bandwidth obtained through conjugation and reverse arrangement is rotated by 90 degrees, to obtain the frequency domain sequence on the subcarriers of the second bandwidth in the transmission bandwidth.

Solution C6: Based on an arrangement of the frequency domain sequence on the subcarriers of the first bandwidth, the frequency domain sequence on the subcarriers of the first bandwidth are reversely arranged after conjugation. Then, a frequency domain sequence at an odd-numbered subcarrier location of the first bandwidth obtained through conjugation and reverse arrangement is multiplied by −i. In other words, a phase of the frequency domain sequence at the odd-numbered subcarrier location of the first bandwidth obtained through conjugation and reverse arrangement is rotated by 270 degrees, to obtain the frequency domain sequence on the subcarriers of the second bandwidth in the transmission bandwidth.

Solution C7: Based on an arrangement of the frequency domain sequence on the subcarriers of the first bandwidth, the frequency domain sequence on the subcarriers of the first bandwidth are reversely arranged after conjugation. Then, a frequency domain sequence at each subcarrier location of the first bandwidth obtained through conjugation and reverse arrangement is multiplied by −1. In other words, a phase of the frequency domain sequence at each subcarrier location of the first bandwidth obtained through conjugation and reverse arrangement is rotated by 180 degrees, to obtain the frequency domain sequence on the subcarriers of the second bandwidth in the transmission bandwidth.

Solution C8: Based on an arrangement of the frequency domain sequence on the subcarriers of the first bandwidth, the frequency domain sequence on the subcarriers of the first bandwidth are reversely arranged after conjugation. Then, a frequency domain sequence at each subcarrier location of the first bandwidth obtained through conjugation and reverse arrangement is multiplied by i. In other words, a phase of the frequency domain sequence at each subcarrier location of the first bandwidth obtained through conjugation and reverse arrangement is rotated by 90 degrees, to obtain the frequency domain sequence on the subcarriers of the second bandwidth in the transmission bandwidth.

Solution C9: Based on an arrangement of the frequency domain sequence on the subcarriers of the first bandwidth, the frequency domain sequence on the subcarriers of the first bandwidth are reversely arranged after conjugation. Then, a frequency domain sequence at each subcarrier location of the first bandwidth obtained through conjugation and reverse arrangement is multiplied by −i. In other words, a phase of the frequency domain sequence at each subcarrier location of the first bandwidth obtained through conjugation and reverse arrangement is rotated by 270 degrees, to obtain the frequency domain sequence on the subcarriers of the second bandwidth in the transmission bandwidth.

In an implementation D, the performing a non-replication operation on a frequency domain sequence on subcarriers of a first bandwidth in a transmission bandwidth includes: performing phase rotation on a part or all of elements in the frequency domain sequence on the subcarriers of the first bandwidth, and then reversely arranging a part or all of elements in the frequency domain sequence on the subcarriers of the first bandwidth after phase rotation and conjugation.

Optionally, before performing the non-replication operation on the frequency domain sequence on the subcarriers of the first bandwidth in the transmission bandwidth, the transmit device performs encoding and modulation on data on the first bandwidth in the transmission bandwidth, as shown in FIG. 2, to obtain the frequency domain sequence on the first bandwidth in the transmission bandwidth. The transmit device may modulate encoded data through DCM or another modulation. The data on the first bandwidth is replicated once through DCM. This improves subcarrier-based frequency diversity effect. In addition, the transmit device may alternatively use another conventional modulation manner.

S102: The transmit device transforms the frequency domain sequences on the subcarriers of the first bandwidth and the second bandwidth into a time domain, and performs radio frequency processing on time domain data.

The transmit device concatenates the frequency domain sequences on the first bandwidth and the second bandwidth, and then transforms a concatenated frequency domain sequence on the entire transmission bandwidth into a time domain through IDFT, to obtain the time domain data. Then, radio frequency processing is performed on the time domain data.

In the entire transmission bandwidth obtained through concatenation, the second bandwidth carries information different from the frequency domain sequence on the subcarriers of the first bandwidth. This can reduce a PAPR of the transmit device, and improve system performance.

S103: The transmit device sends the time domain signal on the transmission bandwidth. Correspondingly, a receive device receives the time domain signal sent by the transmit device on the transmission bandwidth.

S104: The receive device transforms the time domain signal into a frequency domain, to obtain a frequency domain sequence on subcarriers of the transmission bandwidth.

After receiving the time domain signal sent by the transmit device on the transmission bandwidth, the receive device transforms the time domain signal into a frequency domain through DFT, to obtain the frequency domain sequence on the transmission bandwidth. The frequency domain sequence on the subcarriers of the transmission bandwidth includes the frequency domain sequence on the subcarriers of the first bandwidth and the frequency domain sequence on the subcarriers of the second bandwidth. The frequency domain sequence on the subcarriers of the second bandwidth is obtained by performing the non-replication operation on the frequency domain sequence on the subcarriers of the first bandwidth.

S105: The receive device restores the frequency domain sequence on the subcarriers of the second bandwidth.

The restoration operation includes at least one of the following operations:

reversely arranging, based on an arrangement of the frequency domain sequence on the subcarriers of the first bandwidth, the frequency domain sequence on the subcarriers of the second bandwidth after conjugation; or performing corresponding phase rotation on a part or all of elements in the frequency domain sequence on the subcarriers of the second bandwidth.

Specifically, the performing corresponding phase rotation on a part or all of elements in the frequency domain sequence on the subcarriers of the second bandwidth includes at least one of the following operations:

if an element in a frequency domain sequence corresponding to an even-numbered subcarrier location of the second bandwidth is obtained by multiplying an element in a frequency domain sequence at an even-numbered subcarrier location of the first bandwidth by $-1$, i, or $-i$, multiplying the element in the frequency domain sequence corresponding to the even-numbered subcarrier location of the second bandwidth by $-1$, $-i$, or i;

if a frequency domain sequence at an odd-numbered subcarrier location of the second bandwidth is obtained by multiplying a frequency domain sequence at an odd-numbered subcarrier location of the first bandwidth by $-1$, i, or $-i$, multiplying an element in the frequency domain sequence corresponding to the odd-numbered subcarrier location of the second bandwidth by $-1$, $-i$ or i; or if a frequency domain sequence at each subcarrier location of the second bandwidth is obtained by multiplying a frequency domain sequence at each subcarrier location of the first bandwidth by $-1$, i, or $-i$, multiplying the frequency domain sequence at each subcarrier location of the second bandwidth by $-1$, $-i$, or i.

According to the data sending and receiving methods provided in this embodiment of this application, the transmit device performs the non-replication operation on the frequency domain sequence on the subcarriers of the first bandwidth, to obtain the frequency domain sequence on the subcarriers of the second bandwidth in the transmission bandwidth, transforms the frequency domain sequences on the subcarriers of the first bandwidth and the second bandwidth into a time domain, and performs radio frequency processing on time domain data and then sends the data. In this way, different signals are transmitted on the subcarriers of the first bandwidth and the second bandwidth. This can reduce a PAPR of the transmit device, improve system performance, and improve communication reliability.

Embodiment 2

Figure 9:
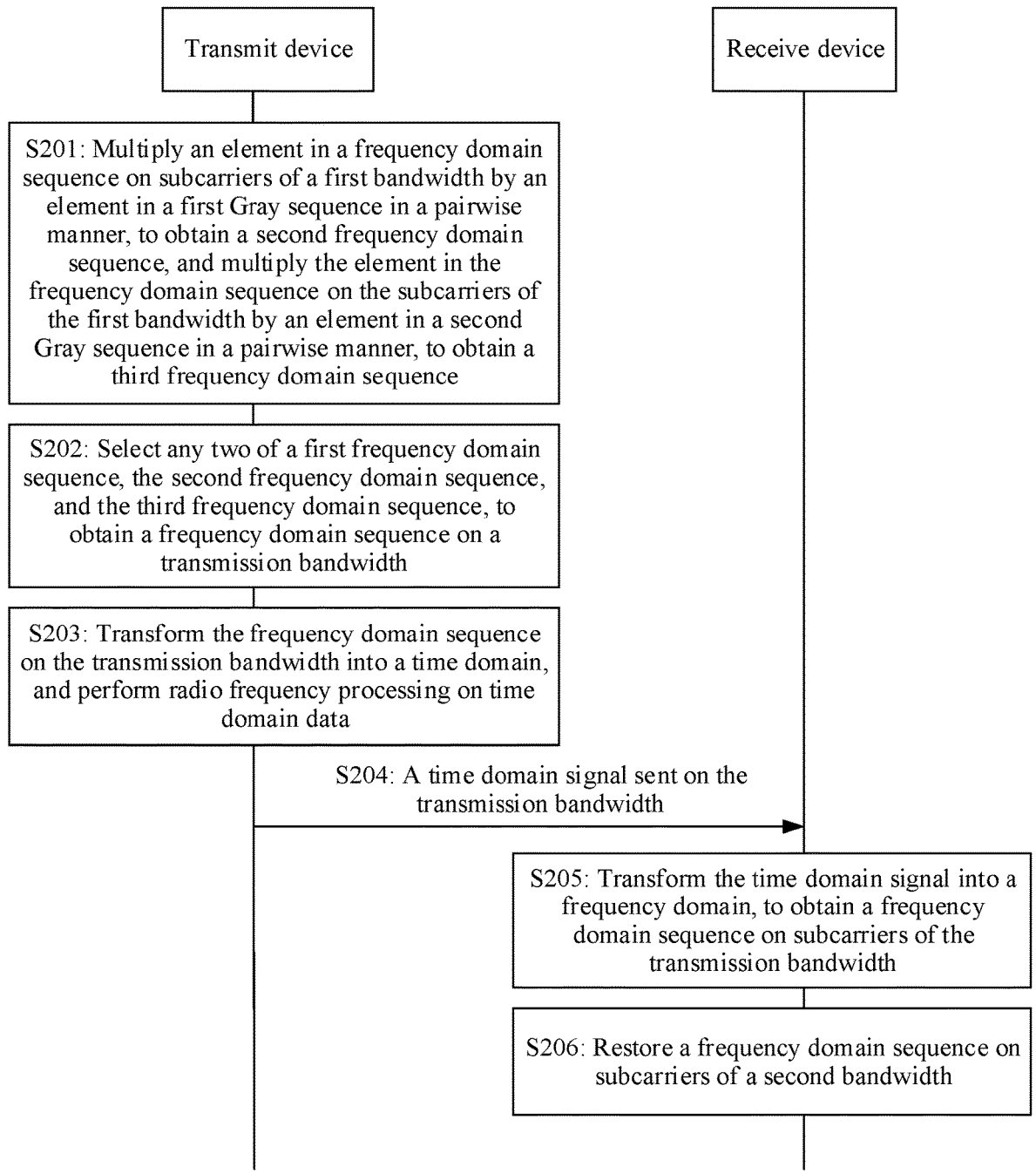
FIG. 9 is a schematic flowchart of another data sending and receiving method according to an embodiment of this application.

FIG. 9 is a schematic flowchart of another data sending and receiving method according to an embodiment of this application. The method may include the following steps.

S201: Multiply an element in a frequency domain sequence on subcarriers of a first bandwidth by an element in a first Gray sequence in a pairwise manner, to obtain a second frequency domain sequence, and multiply the element in the frequency domain sequence on the subcarriers of the first bandwidth by an element in a second Gray sequence in a pairwise manner, to obtain a third frequency domain sequence, where any one of a first frequency domain sequence, the second frequency domain sequence, or the third frequency domain sequence is used as a frequency domain sequence on subcarriers of a second bandwidth, and the first frequency domain sequence includes the element in the frequency domain sequence on the subcarriers of the first bandwidth.

First, in a DUP mode of a given bandwidth, a frequency domain sequence of a half bandwidth is generated through conventional modulation or DCM. If an LDPC encoder is used, an LDPC tone mapper is used to perform location mapping on the frequency domain sequence. If BCC encoding is used, an LDPC tone mapper is not used. In this way, the frequency domain sequence, namely, the first frequency domain sequence $RU_{half}$ of the first bandwidth (which may be the half bandwidth) is obtained.

Then, a pair of Gray complementary pair sequences whose length is equal to a quantity of subcarriers corresponding to the first bandwidth are obtained: the first Gray sequence Ga and the second Gray sequence Gb. The first Gray sequence and the second Gray sequence are a pair of Gray complementary pair sequences, elements in the first Gray sequence include 1 and −1, and elements in the second Gray sequence include 1 and −1.

A corresponding element in the sequence Ga is multiplied by a corresponding element in the frequency domain sequence $RU_{half}$ corresponding to the first bandwidth in a pairwise manner, to obtain a new frequency domain sequence, namely, the second frequency domain sequence $RU_{halfA}$, whose length is a quantity of subcarriers corresponding to the half bandwidth. Likewise, a corresponding element in the sequence Gb is multiplied by a corresponding element in the frequency domain sequence $RU_{half}$ corresponding to the half bandwidth, to obtain a new frequency domain sequence, namely, the third frequency domain sequence $R_{UhalfB}$, whose length is a quantity of subcarriers corresponding to the half bandwidth.

S202: Select any two of the first frequency domain sequence, the second frequency domain sequence, and the third frequency domain sequence, to obtain a frequency domain sequence on a transmission bandwidth.

Any two sequences are selected from the frequency domain sequences $RU_{half}$, $RU_{half}A$, and $R_{UhalfB}$, and are directly concatenated into the frequency domain sequence corresponding to the entire bandwidth. In this case, the frequency domain sequence corresponding to the first bandwidth may be any one of the first frequency domain sequence, the second frequency domain sequence, or the third frequency domain sequence. The frequency domain sequence corresponding to the second bandwidth may also be any one of the first frequency domain sequence, the second frequency domain sequence, or the third frequency domain sequence.

In an implementation, two frequency domain sequences $RU_{halfA}$ and $R_{UhalfB}$ obtained through Gray sequence processing are selected from the entire transmission bandwidth. A simulation result is shown in FIG. 10.

In another implementation, only one Gray sequence $RU_{halfA}$ or $R_{UhalfB}$ is selected from the entire transmission bandwidth. Another frequency domain sequence is the first frequency domain sequence. A simulation result is shown in FIG. 11.

A Gray complementary pair refers to two sequences with a same length, and sequence elements are only 1 and −1. A sum of autocorrelation functions of the two sequences has a value only when a delay is 0, and other delays are all 0. Therefore, after the two sequences are transformed into a time domain through IFFT, a sum of squares of time domain signal amplitudes is constant, so that PAPRs of time domain signals corresponding to the two sequences are not greater than 3 dB. Therefore, the Gray complementary pair may be used to reduce a PAPR of an OFDM system.

Figure 10:
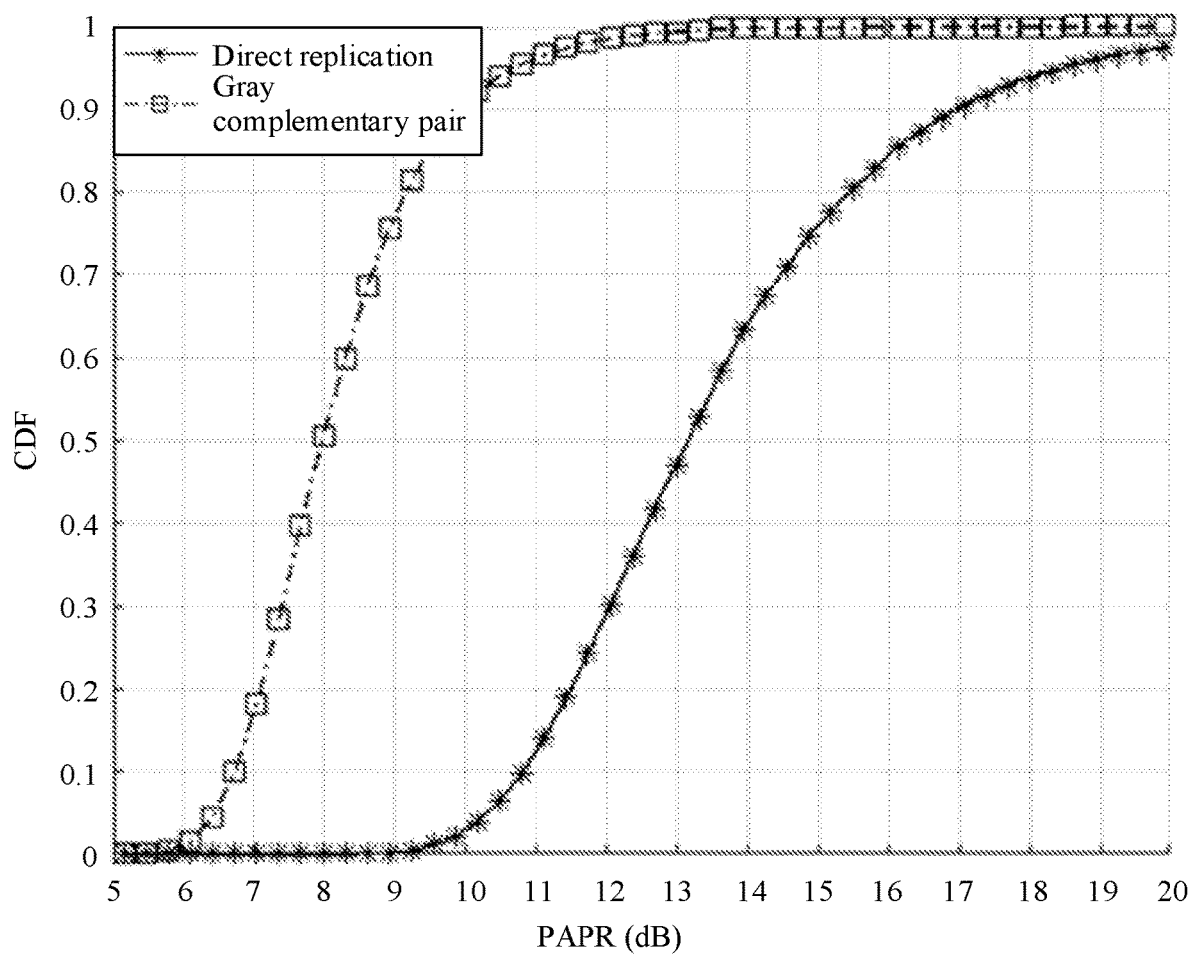
FIG. 10 is a schematic diagram of PAPR simulation results corresponding to two frequency domain sequences obtained through Gray sequence processing in an entire transmission bandwidth.
Figure 11:
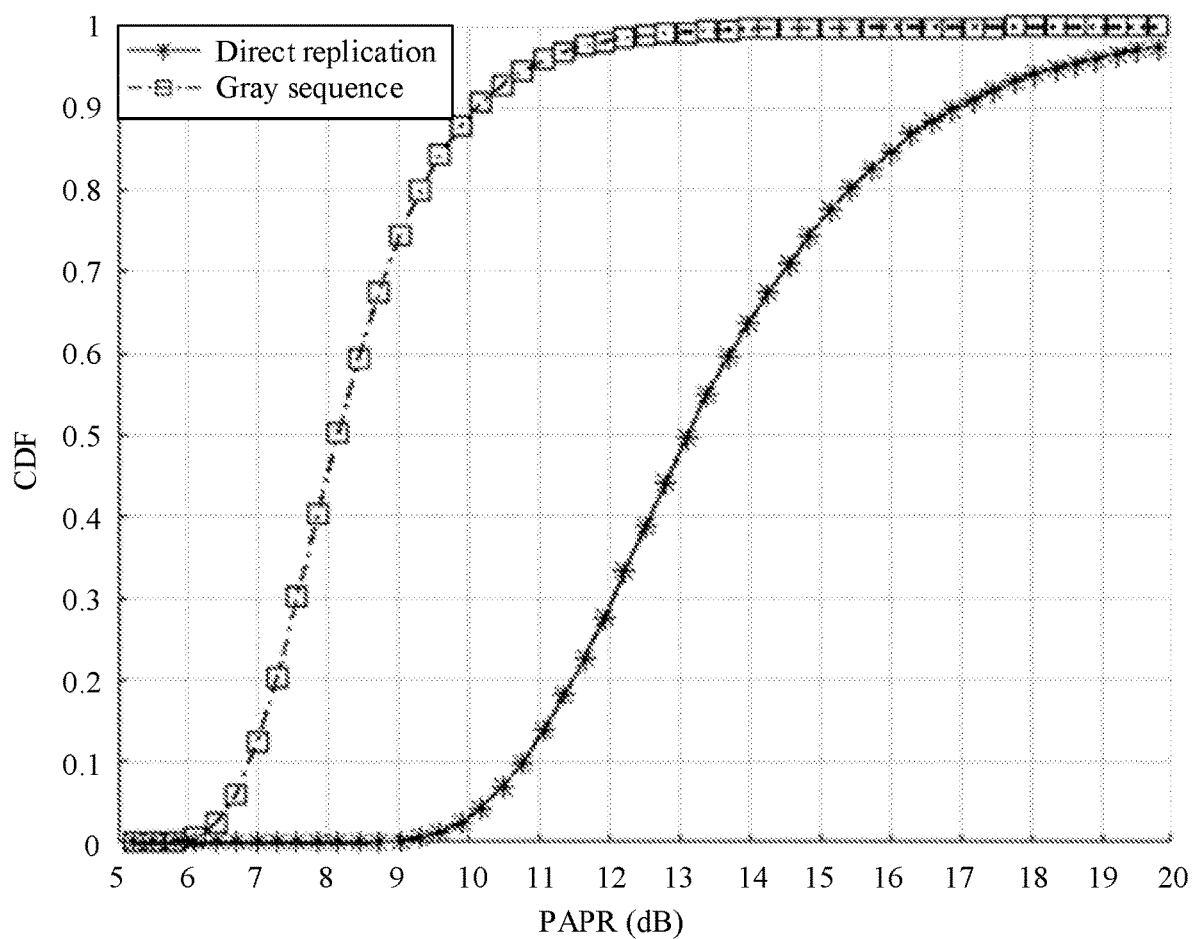
FIG. 11 is a schematic diagram of a PAPR simulation result of a time domain signal corresponding to one combined frequency domain sequence obtained through Gray sequence processing in an entire transmission bandwidth.

It may be learned from the simulation results shown in FIG. 10 and FIG. 11 that, compared with a PAPR of a directly-replicated signal, a PAPR of a signal obtained through Gray sequence processing is obviously reduced.

In addition, if a DCM technology is used for repeated sending in the frequency domain of the first bandwidth, a diversity gain in the frequency domain may be increased. In addition, because repeated information is processed by using the Gray complementary pair sequences, a time domain signal corresponding to the repeated information is no longer similar into a time domain signal corresponding to original information, and therefore the diversity gain in the time domain increases.

S203: Transform the frequency domain sequence on the transmission bandwidth into a time domain, and perform radio frequency processing on time domain data.

The entire frequency domain sequence is transformed into a time domain through IDFT, and the time domain signal is sent over a radio frequency link.

S204: The transmit device sends the time domain signal on the transmission bandwidth. Correspondingly, a receive device receives the time domain signal sent by the transmit device on the transmission bandwidth.

S205: The receive device transforms the time domain signal into a frequency domain, to obtain a frequency domain sequence on subcarriers of the transmission bandwidth, where the frequency domain sequence on the subcarriers of the transmission bandwidth includes a frequency domain sequence on subcarriers of a first bandwidth and a frequency domain sequence on subcarriers of a second bandwidth, and the frequency domain sequence on the subcarriers of the second bandwidth is obtained by performing a non-replication operation on the frequency domain sequence on the subcarriers of the first bandwidth.

S206: Restore the frequency domain sequence on the subcarriers of the second bandwidth.

Specifically, if the frequency domain sequence on the subcarriers of the second bandwidth at a transmit end is obtained by multiplying an element in a first frequency domain sequence corresponding to the frequency domain sequence on the subcarriers of the first bandwidth by an element in a first Gray sequence in a pairwise manner, and elements in the first Gray sequence are all 1 or −1, a corresponding element in the frequency domain sequence on the subcarriers of the second bandwidth at a receive end is multiplied by a corresponding element in the first Gray sequence to obtain a restored frequency domain sequence on the second bandwidth; or if the frequency domain sequence on the subcarriers of the second bandwidth at a transmit end is obtained by multiplying an element in a first frequency domain sequence corresponding to the frequency domain sequence on the subcarriers of the first bandwidth by an element in a second Gray sequence in a pairwise manner, and elements in the second Gray sequence are all 1 or −1, a sequence obtained by multiplying an element in the frequency domain sequence on the subcarriers of the second bandwidth at a receive end by an element in the second Gray sequence in a pairwise manner is used as a restored frequency domain sequence on the subcarriers of the second bandwidth.

According to the data sending and receiving methods provided in this embodiment of this application, the transmit device performs processing on the frequency domain sequence on the subcarriers of the first bandwidth by using the Gray complementary pair sequences, to obtain the frequency domain sequence on the subcarriers of the second bandwidth in the transmission bandwidth. In this way, different signals are transmitted on the first bandwidth and the second bandwidth. This can reduce a PAPR of the transmit device, improve system performance, and improve communication reliability.

The foregoing describes the solutions provided in embodiments of this application. It may be understood that, to implement the foregoing functions, a data sending/receiving apparatus (for example, an AP or a STA) includes corresponding hardware structures and/or software modules for performing the functions. A person skilled in the art should easily be aware that, in combination with units and algorithm steps of the examples described in embodiments disclosed in this specification, this application may be implemented by hardware or a combination of hardware and computer software. Whether a specific function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the data sending/receiving apparatus may be divided into functional modules based on the foregoing method examples. For example, each functional module may be obtained through division based on each function, or two or more functions may be integrated into one processing module. The functional module may be implemented in a form of hardware, or may be implemented in a form of a software functional module. It should be noted that, in the embodiments of this application, division into the modules is an example, and is merely logical function division. In actual implementation, another division manner may be used. The following uses division of each functional module based on a corresponding function as an example for description.

Figure 12:
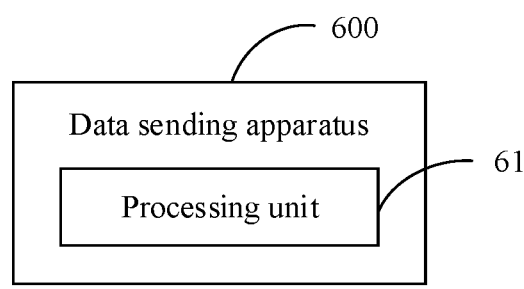
FIG. 12 is a schematic diagram of a structure of a data sending apparatus according to an embodiment of this application.

FIG. 12 is a possible schematic diagram of a structure of a data sending apparatus. The data sending apparatus 600 includes a processing unit 61. The processing unit 61 is configured to: perform a non-replication operation on a frequency domain sequence on subcarriers of a first bandwidth in a transmission bandwidth, to obtain a frequency domain sequence on subcarriers of a second bandwidth in the transmission bandwidth, where the subcarrier includes a data subcarrier and a pilot subcarrier; and transform the frequency domain sequences on the subcarriers of the first bandwidth and the second bandwidth into a time domain, and perform radio frequency processing on time domain data and then send the data. For all related content of each step involved in the foregoing method embodiment, refer to function descriptions of a corresponding functional module. Details are not described herein again.

Figure 13:
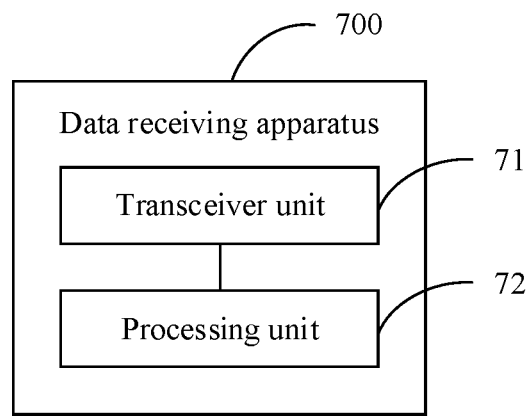
FIG. 13 is a schematic diagram of a structure of a data receiving apparatus according to an embodiment of this application.

FIG. 13 is a possible schematic diagram of a structure of a data receiving apparatus. The data receiving apparatus 700 includes a transceiver unit 71 and a processing unit 72. The transceiver unit 71 is configured to receive a time domain signal sent on a transmission bandwidth. The processing unit 72 is configured to: transform the time domain signal into a frequency domain, to obtain a frequency domain sequence on subcarriers of the transmission bandwidth, where the frequency domain sequence on the subcarriers of the transmission bandwidth includes a frequency domain sequence on subcarriers of a first bandwidth and a frequency domain sequence on subcarriers of a second bandwidth, and the frequency domain sequence on the subcarriers of the second bandwidth is obtained by performing a non-replication operation on the frequency domain sequence on the subcarriers of the first bandwidth; and restore the frequency domain sequence on the subcarriers of the second bandwidth. For all related content of each step involved in the foregoing method embodiment, refer to function descriptions of a corresponding functional module. Details are not described herein again.

A person of ordinary skill in the art may understand that all or some of the steps of the method embodiments may be implemented by hardware relevant to program instructions. The program instructions may be stored in a computer-readable storage medium. When the program instructions are run, the steps of the method embodiments are performed. The foregoing storage medium includes any medium that can store program code, such as a USB flash drive, a removable hard disk, a ROM, a RAM, a magnetic disk, or an optical disc.

According to one aspect, an embodiment of this application further provides a readable storage medium. The readable storage medium stores computer-executable instructions. When the computer-executable instructions are run, a device (which may be a single-chip microcomputer, a chip, a controller, or the like) or a processor is enabled to perform the steps in the data sending/receiving method provided in this application.

According to one aspect, an embodiment of this application further provides a computer program product. The computer program product includes computer-executable instructions. The computer-executable instructions are stored in a computer-readable storage medium. At least one processor of a device may read the computer-executable instructions from the computer-readable storage medium. The at least one processor executes the computer-executable instructions, so that the device performs the steps in the data sending/receiving method provided in this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners. For example, division into the units is merely logical function division and may be another division in actual implementation. For example, a plurality of units or components may be combined or integrated into another system, or some features may be ignored or not performed. The displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one place, or may be distributed on a plurality of network units. Some or all of the units may be selected based on an actual requirement to achieve the objectives of the solutions of embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium, or transmitted by using the computer-readable storage medium. The computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center that integrates one or more usable media. The usable medium may be a read-only memory (read-only memory, ROM), a random access memory (random access memory, RAM), or a magnetic medium, for example, a floppy disk, a hard disk, a magnetic tape, a magnetic disk, or an optical medium, for example, a digital versatile disc (digital versatile disc, DVD), or a semiconductor medium, for example, a solid state disk (solid state disk, SSD).

What is claimed is:

1. A communication method, comprising:
   performing a non-replication operation on a frequency domain sequence on subcarriers of a first bandwidth in a transmission bandwidth, to obtain a frequency domain sequence on subcarriers of a second bandwidth in the transmission bandwidth, wherein the subcarriers of the first bandwidth and the subcarriers of the second bandwidth comprise a data subcarrier and a pilot subcarrier, and the non-replication operation is based on at least one of conjugation or a pair of Gray complementary pair sequences;
   transforming the frequency domain sequence on the subcarriers of the first bandwidth and the frequency domain sequence on the subcarriers of the second bandwidth into time domain data;
   performing radio frequency processing on the time domain data; and
   sending the processed time domain data, wherein the performing a non-replication operation on a frequency domain sequence on subcarriers of a first bandwidth in a transmission bandwidth, to obtain a frequency domain sequence on subcarriers of a second bandwidth in the transmission bandwidth comprises at least one of the following operations:
      reversely arranging, based on an arrangement of the frequency domain sequence on the subcarriers of the first bandwidth, the frequency domain sequence on the subcarriers of the first bandwidth after the conjugation;
      performing phase rotation and the conjugation on a part or all of elements in the frequency domain sequence on the subcarriers of the first bandwidth; or
      multiplying an element in the frequency domain sequence on the subcarriers of the first bandwidth by an element in a first Gray sequence in a pairwise manner, to obtain a second frequency domain sequence, and multiplying the element in the frequency domain sequence on the subcarriers of the first bandwidth by an element in a second Gray sequence in a pairwise manner, to obtain a third frequency domain sequence, wherein the pair of Gray complementary pair sequences comprises the first Gray sequence and the second Gray sequence, at least one of a first frequency domain sequence, the second frequency domain sequence, or the third frequency domain sequence is used as the frequency domain sequence on the subcarriers of the second bandwidth, and the first frequency domain sequence comprises the element in the frequency domain sequence on the subcarriers of the first bandwidth.

2. The method according to claim 1, wherein the performing phase rotation and the conjugation on a part or all of elements in the frequency domain sequence on the subcarriers of the first bandwidth comprises determining a phase-rotated frequency domain sequence by at least one of the following operations:
   multiplying an element in a frequency domain sequence at an even-numbered subcarrier location of the first bandwidth by −1, i, or −i;
   multiplying an element in a frequency domain sequence at an odd-numbered subcarrier location of the first bandwidth by −1, i, or −i; or
   multiplying a frequency domain sequence at each subcarrier location of the first bandwidth by −1, i, or −i.

3. The method according to claim 1, wherein the performing phase rotation and the conjugation on a part or all of elements in the frequency domain sequence on the subcarriers of the first bandwidth further comprises:
   determining a conjugated frequency domain sequency by conjugating the phase-rotated frequency domain sequence; and
   reversely arranging elements of the conjugated frequency domain sequence based on the subcarriers of the first bandwidth.

4. A communication method, comprising:
   receiving a time domain signal sent on a transmission bandwidth;
   transforming the time domain signal into a frequency domain, to obtain a frequency domain sequence on subcarriers of the transmission bandwidth, wherein the frequency domain sequence on the subcarriers of the transmission bandwidth comprises a frequency domain sequence on subcarriers of a first bandwidth and a frequency domain sequence on subcarriers of a second bandwidth, the frequency domain sequence on the subcarriers of the second bandwidth is obtained by performing a non-replication operation on the frequency domain sequence on the subcarriers of the first bandwidth, and the non-replication operation is based on at least one of conjugation or a pair of Gray complementary pair sequences; and
   restoring the frequency domain sequence on the subcarriers of the second bandwidth, wherein the restoring the frequency domain sequence on the subcarriers of the second bandwidth comprises at least one of the following operations:
      reversely arranging, based on an arrangement of the frequency domain sequence on the subcarriers of the first bandwidth, the frequency domain sequence on the subcarriers of the second bandwidth after the conjugation;
      performing corresponding phase rotation and the conjugation on a part or all of elements in the frequency domain sequence on the subcarriers of the second bandwidth;
      in response to determining that the frequency domain sequence on the subcarriers of the second bandwidth at a transmit end is obtained by multiplying an element in a first frequency domain sequence corresponding to the frequency domain sequence on the subcarriers of the first bandwidth by an element in a first Gray sequence in a pairwise manner, and elements in the first Gray sequence are all 1 or −1, multiplying a corresponding element in the frequency domain sequence on the subcarriers of the second bandwidth at a receive end by a corresponding element in the first Gray sequence to obtain a restored frequency domain sequence on the second bandwidth; or in response to determining that the frequency domain sequence on the subcarriers of the second bandwidth at a transmit end is obtained by multiplying an element in a first frequency domain sequence corresponding to the frequency domain sequence on the subcarriers of the first bandwidth by an element in a second Gray sequence in a pairwise manner, and elements in the second Gray sequence are all 1 or −1, using, as a restored frequency domain sequence on the subcarriers of the second bandwidth, a sequence obtained by multiplying an element in the frequency domain sequence on the subcarriers of the second bandwidth at a receive end by an element in the second Gray sequence in a pairwise manner, wherein the pair of Gray complementary pair sequences comprises the first Gray sequence and the second Gray sequence.

5. The method according to claim 4, wherein the performing corresponding phase rotation and the conjugation on a part or all of elements in the frequency domain sequence on the subcarriers of the second bandwidth comprises at least one of the following operations:

in response to determining that an element in a frequency domain sequence corresponding to an even-numbered subcarrier location of the second bandwidth is obtained by multiplying an element in a frequency domain sequence at an even-numbered subcarrier location of the first bandwidth by −1, i, or −i, multiplying the element in the frequency domain sequence corresponding to the even-numbered subcarrier location of the second bandwidth by −1, −i, or i;

in response to determining that a frequency domain sequence at an odd-numbered subcarrier location of the second bandwidth is obtained by multiplying a frequency domain sequence at an odd-numbered subcarrier location of the first bandwidth by −1, i, or −i, multiplying an element in the frequency domain sequence corresponding to the odd-numbered subcarrier location of the second bandwidth by −1, −i or i; or in response to determining that a frequency domain sequence at each subcarrier location of the second bandwidth is obtained by multiplying a frequency domain sequence at each subcarrier location of the first bandwidth by −1, i, or −i, multiplying the frequency domain sequence at each subcarrier location of the second bandwidth by −1, −i, or i.

6. A communication apparatus, comprising:

at least one processor, and one or more memories coupled to the at least one processor and storing programming instructions for execution by the at least one processor to cause the communication apparatus to perform operations comprising:

performing a non-replication operation on a frequency domain sequence on subcarriers of a first bandwidth in a transmission bandwidth, to obtain a frequency domain sequence on subcarriers of a second bandwidth in the transmission bandwidth, wherein the subcarriers of the first bandwidth and the subcarriers of the second bandwidth comprise a data subcarrier and a pilot subcarrier, and the non-replication operation is based on at least one of conjugation or a pair of Gray complementary pair sequences;

transforming the frequency domain sequence on the subcarriers of the first bandwidth and the frequency domain sequence on the subcarriers of the second bandwidth into time domain data;

performing radio frequency processing on the time domain data; and sending the processed time domain data, wherein the performing a non-replication operation on a frequency domain sequence on subcarriers of a first bandwidth in a transmission bandwidth, to obtain a frequency domain sequence on subcarriers of a second bandwidth in the transmission bandwidth comprises at least one of the following operations:

reversely arranging, based on an arrangement of the frequency domain sequence on the subcarriers of the first bandwidth, the frequency domain sequence on the subcarriers of the first bandwidth after the conjugation;

performing phase rotation and the conjugation on a part or all of elements in the frequency domain sequence on the subcarriers of the first bandwidth; or multiplying an element in the frequency domain sequence on the subcarriers of the first bandwidth by an element in a first Gray sequence in a pairwise manner, to obtain a second frequency domain sequence, and multiplying the element in the frequency domain sequence on the subcarriers of the first bandwidth by an element in a second Gray sequence in a pairwise manner, to obtain a third frequency domain sequence, wherein the pair of Gray complementary pair sequences comprises the first Gray sequence and the second Gray sequence, at least one of a first frequency domain sequence, the second frequency domain sequence, or the third frequency domain sequence is used as the frequency domain sequence on the subcarriers of the second bandwidth, and the first frequency domain sequence comprises the element in the frequency domain sequence on the subcarriers of the first bandwidth.

7. The communication apparatus according to claim 6, wherein the performing phase rotation and the conjugation on a part or all of elements in the frequency domain sequence on the subcarriers of the first bandwidth comprises determining a phase-rotated frequency domain sequence by at least one of the following operations:

multiplying an element in a frequency domain sequence at an even-numbered subcarrier location of the first bandwidth by −1, i, or −i;

multiplying an element in a frequency domain sequence at an odd-numbered subcarrier location of the first bandwidth by −1, i, or −i; or multiplying a frequency domain sequence at each subcarrier location of the first bandwidth by −1, i, or −i.

8. The communication apparatus according to claim 6, wherein the performing phase rotation and the conjugation on a part or all of elements in the frequency domain sequence on the subcarriers of the first bandwidth further comprises:

determining a conjugated frequency domain sequency by conjugating the phase-rotated frequency domain sequence; and reversely arranging elements of the conjugated frequency domain sequence based on the subcarriers of the first bandwidth.

9. A communication apparatus, comprising:

at least one processor, and one or more memories coupled to the at least one processor and storing programming instructions for execution by the at least one processor to cause the communication apparatus to perform operations comprising:
  receiving a time domain signal sent on a transmission bandwidth;
  transforming the time domain signal into a frequency domain, to obtain a frequency domain sequence on subcarriers of the transmission bandwidth, wherein the frequency domain sequence on the subcarriers of the transmission bandwidth comprises a frequency domain sequence on subcarriers of a first bandwidth and a frequency domain sequence on subcarriers of a second bandwidth, the frequency domain sequence on the subcarriers of the second bandwidth is obtained by performing a non-replication operation on the frequency domain sequence on the subcarriers of the first bandwidth, and the non-replication operation is based on at least one of conjugation or a pair of Gray complementary pair sequences; and
  restoring the frequency domain sequence on the subcarriers of the second bandwidth, wherein the restoring the frequency domain sequence on the subcarriers of the second bandwidth comprises at least one of the following operations:
  reversely arranging, based on an arrangement of the frequency domain sequence on the subcarriers of the first bandwidth, the frequency domain sequence on the subcarriers of the second bandwidth after the conjugation;
  performing corresponding phase rotation and the conjugation on a part or all of elements in the frequency domain sequence on the subcarriers of the second bandwidth;
  in response to determining that the frequency domain sequence on the subcarriers of the second bandwidth at a transmit end is obtained by multiplying an element in a first frequency domain sequence corresponding to the frequency domain sequence on the subcarriers of the first bandwidth by an element in a first Gray sequence in a pairwise manner, and elements in the first Gray sequence are all 1 or −1, multiplying a corresponding element in the frequency domain sequence on the subcarriers of the second bandwidth at a receive end by a corresponding element in the first Gray sequence to obtain a restored frequency domain sequence on the second bandwidth; or
  in response to determining that the frequency domain sequence on the subcarriers of the second bandwidth at a transmit end is obtained by multiplying an element in a first frequency domain sequence corresponding to the frequency domain sequence on the subcarriers of the first bandwidth by an element in a second Gray sequence in a pairwise manner, and elements in the second Gray sequence are all 1 or −1, using, as a restored frequency domain sequence on the subcarriers of the second bandwidth, a sequence obtained by multiplying an element in the frequency domain sequence on the subcarriers of the second bandwidth at a receive end by an element in the second Gray sequence in a pairwise manner, wherein the pair of Gray complementary pair sequences comprises the first Gray sequence and the second Gray sequence.

10. The communication apparatus according to claim 9, wherein the performing corresponding phase rotation and the conjugation on a part or all of elements in the frequency domain sequence on the subcarriers of the second bandwidth comprises at least one of the following operations:

in response to determining that an element in a frequency domain sequence corresponding to an even-numbered subcarrier location of the second bandwidth is obtained by multiplying an element in a frequency domain sequence at an even-numbered subcarrier location of the first bandwidth by −1, i, or −i, multiplying the element in the frequency domain sequence corresponding to the even-numbered subcarrier location of the second bandwidth by −1, −i, or i;
  in response to determining that a frequency domain sequence at an odd-numbered subcarrier location of the second bandwidth is obtained by multiplying a frequency domain sequence at an odd-numbered subcarrier location of the first bandwidth by −1, i, or −i, multiplying an element in the frequency domain sequence corresponding to the odd-numbered subcarrier location of the second bandwidth by −1, −i or i; or
  in response to determining that a frequency domain sequence at each subcarrier location of the second bandwidth is obtained by multiplying a frequency domain sequence at each subcarrier location of the first bandwidth by −1, i, or −i, multiplying the frequency domain sequence at each subcarrier location of the second bandwidth by −1, −i, or i.

11. The method according to claim 1, wherein elements in the first Gray sequence and the second Gray sequence are all 1 or −1.

12. The method according to claim 1, wherein the method further comprises:
  obtaining the frequency domain sequence on the subcarriers of the first bandwidth in the transmission bandwidth.

13. The method according to claim 1, wherein the transmission bandwidth is 80 MHz, the first bandwidth and the second bandwidth each are 40 MHz, and the first bandwidth is divided by using a subcarrier frequency domain resource block of a resource unit (RU) 484;
  the transmission bandwidth is 160 MHz, the first bandwidth and the second bandwidth each are 80 MHz, and the first bandwidth is divided by using a subcarrier frequency domain resource block of an RU 996; or
  the transmission bandwidth is 320 MHz, the first bandwidth and the second bandwidth each are 160 MHz, and the first bandwidth is divided by using a subcarrier frequency domain resource block of an RU 2×996.

14. The method according to claim 4, wherein elements in the first Gray sequence and the second Gray sequence are all 1 or −1.

15. The method according to claim 4, wherein the transmission bandwidth is 80 MHz, the first bandwidth and the second bandwidth each are 40 MHz, and the first bandwidth is divided by using a subcarrier frequency domain resource block of a resource unit (RU) 484;
  the transmission bandwidth is 160 MHz, the first bandwidth and the second bandwidth each are 80 MHz, and the first bandwidth is divided by using a subcarrier frequency domain resource block of an RU 996; or
  the transmission bandwidth is 320 MHZ, the first bandwidth and the second bandwidth each are 160 MHZ, and the first bandwidth is divided by using a subcarrier frequency domain resource block of an RU 2×996.

16. The communication apparatus according to claim 6, wherein elements in the first Gray sequence and the second Gray sequence are all 1 or −1.

17. The communication apparatus according to claim 6, wherein the operations further comprising:

obtaining the frequency domain sequence on the subcarriers of the first bandwidth in the transmission bandwidth.

18. The communication apparatus according to claim 6, wherein the transmission bandwidth is 80 MHz, the first bandwidth and the second bandwidth each are 40 MHz, and the first bandwidth is divided by using a subcarrier frequency domain resource block of a resource unit (RU) 484;
the transmission bandwidth is 160 MHz, the first bandwidth and the second bandwidth each are 80 MHz, and the first bandwidth is divided by using a subcarrier frequency domain resource block of an RU 996; or
the transmission bandwidth is 320 MHz, the first bandwidth and the second bandwidth each are 160 MHz, and the first bandwidth is divided by using a subcarrier frequency domain resource block of an RU 2×996.

19. The communication apparatus according to claim 9, wherein elements in the first Gray sequence and the second Gray sequence are all 1 or −1.

20. The communication apparatus according to claim 9, wherein the transmission bandwidth is 80 MHz, the first bandwidth and the second bandwidth each are 40 MHz, and the first bandwidth is divided by using a subcarrier frequency domain resource block of a resource unit (RU) 484;
the transmission bandwidth is 160 MHz, the first bandwidth and the second bandwidth each are 80 MHz, and the first bandwidth is divided by using a subcarrier frequency domain resource block of an RU 996; or
the transmission bandwidth is 320 MHz, the first bandwidth and the second bandwidth each are 160 MHz, and the first bandwidth is divided by using a subcarrier frequency domain resource block of an RU 2×996.

\* \* \* \* \*

UNITED STATES PATENT AND TRADEMARK OFFICE
CERTIFICATE OF CORRECTION

| | | |
|---|---|---|
| PATENT NO. | : 12,362,978 B2 | Page 1 of 1 |
| APPLICATION NO. | : 18/166965 | |
| DATED | : July 15, 2025 | |
| INVENTOR(S) | : Chenchen Liu et al. | |

It is certified that error appears in the above-identified patent and that said Letters Patent is hereby corrected as shown below:

In the Claims

In Column 28, In Line 59, In Claim 15, delete "MHZ," and insert -- MHz, --.

In Column 28, In Line 60, In Claim 15, delete "MHZ," and insert -- MHz, --.

Signed and Sealed this
Twenty-third Day of December, 2025

John A. Squires
*Director of the United States Patent and Trademark Office*